US008275810B2

(12) United States Patent
Barton

(10) Patent No.: US 8,275,810 B2
(45) Date of Patent: Sep. 25, 2012

(54) MAKING AND USING ABSTRACT XML REPRESENTATIONS OF DATA DICTIONARY METADATA

(75) Inventor: Lee B. Barton, Winchester, MA (US)

(73) Assignee: Oracle International Corporation, Redwood Shores, CA (US)

( * ) Notice: Subject to any disclaimer, the term of this patent is extended or adjusted under 35 U.S.C. 154(b) by 146 days.

(21) Appl. No.: 11/174,909

(22) Filed: Jul. 5, 2005

(65) Prior Publication Data

US 2007/0011192 A1   Jan. 11, 2007

(51) Int. Cl.
*G06F 17/30* (2006.01)
(52) U.S. Cl. ......... 707/803; 707/759; 707/769; 707/809
(58) Field of Classification Search .................. 707/1, 2, 707/3, 4, 5, 6, 7, 8, 9, 10, 100, 101, 102, 707/103, 104, 200, 201, 202; 709/226, 231, 709/223
See application file for complete search history.

(56) References Cited

U.S. PATENT DOCUMENTS

| | | | | |
|---|---|---|---|---|
| 5,848,417 A * | 12/1998 | Shoji et al. | | 707/102 |
| 6,289,382 B1 * | 9/2001 | Bowman-Amuah | | 709/226 |
| 6,708,186 B1 * | 3/2004 | Claborn et al. | | 707/102 |
| 6,925,470 B1 * | 8/2005 | Sangudi et al. | | 1/1 |
| 6,970,882 B2 * | 11/2005 | Yao et al. | | 707/102 |
| 6,985,905 B2 * | 1/2006 | Prompt et al. | | 707/102 |
| 7,013,315 B1 * | 3/2006 | Boothby | | 707/203 |
| 7,120,645 B2 * | 10/2006 | Manikutty et al. | | 707/102 |
| 7,124,140 B2 | 10/2006 | Barton | | |
| 7,136,868 B2 * | 11/2006 | Sonkin et al. | | 707/102 |
| 7,158,974 B2 * | 1/2007 | Williams et al. | | 707/769 |
| 7,203,692 B2 * | 4/2007 | Tabatabai et al. | | 707/102 |
| 7,216,131 B2 * | 5/2007 | Saari et al. | | 707/104.1 |
| 7,269,664 B2 * | 9/2007 | Hutsch et al. | | 709/246 |
| 7,284,191 B2 * | 10/2007 | Grefenstette et al. | | 715/230 |
| 7,296,028 B1 * | 11/2007 | Ivanova | | 707/100 |
| 7,313,575 B2 * | 12/2007 | Carr et al. | | 707/104.1 |
| 2003/0163479 A1 * | 8/2003 | Mathews et al. | | 707/102 |
| 2004/0044680 A1 * | 3/2004 | Thorpe et al. | | 707/102 |
| 2004/0078577 A1 * | 4/2004 | Feng et al. | | 713/182 |
| 2004/0093323 A1 * | 5/2004 | Bluhm et al. | | 707/3 |

(Continued)

OTHER PUBLICATIONS

Jonathan Gennick, "SQL in, XML out", Oracle Magazine, May/Jun. 2003, 5 pages.

(Continued)

*Primary Examiner* — Pierre Vital
*Assistant Examiner* — Mohammad S Rostami
(74) *Attorney, Agent, or Firm* — Vista IP Law Group, LLP

(57) ABSTRACT

An XML representation of the metadata for objects in a database system. The XML representation is called SXML. The SXML representations of two objects that belong to the same class of objects may be compared to produce a difference representation that shows the differences between the objects. Database commands that will create or alter objects may be produced from the difference representation, as well as an XML representation of the database commands. In addition to being comparable, SXML representations have the characteristics that a given property of the metadata is expressed in only one way in the representation, that SXML does not describe properties that belong only to particular instances of the object described by the metadata, that SXML describes only properties that the user can specify when creating an object, and that SXML is easy for humans to read, understand, and write.

28 Claims, 38 Drawing Sheets

U.S. PATENT DOCUMENTS

| | | | |
|---|---|---|---|
| 2004/0153469 A1* | 8/2004 | Keith-Hill | 707/101 |
| 2004/0172442 A1* | 9/2004 | Ripley | 709/200 |
| 2005/0125385 A1* | 6/2005 | Bommegowda et al. | 707/3 |
| 2005/0138063 A1* | 6/2005 | Bazot et al. | 707/102 |
| 2005/0197783 A1* | 9/2005 | Kuchinsky et al. | 702/19 |
| 2005/0289175 A1* | 12/2005 | Krishnaprasad et al. | 707/102 |
| 2006/0004814 A1* | 1/2006 | Lawrence et al. | 707/101 |
| 2006/0085465 A1* | 4/2006 | Nori et al. | 707/101 |
| 2006/0106820 A1* | 5/2006 | Bender et al. | 707/100 |
| 2006/0123048 A1* | 6/2006 | Larson | 707/103 R |
| 2006/0161558 A1* | 7/2006 | Tamma et al. | 707/100 |
| 2006/0209797 A1* | 9/2006 | Anisimov et al. | 370/352 |
| 2006/0248467 A1* | 11/2006 | Elvanoglu et al. | 715/744 |
| 2006/0271574 A1* | 11/2006 | Villaron et al. | 707/100 |

OTHER PUBLICATIONS

Victor Votsch et al., "Oracle XML DB: Uniting XML Content and Data", Seybold Consulting Group, Mar. 2002, 14 pages.

Jinyu Wang, "Building High-Performance Enterprise XML Applications with Oracle Database 10g", Mar. 2005, 17 pages.

Daniel Lipkin et al., "XSL Transformations (XSLT)" Version 1.0, W3C Recommendation Nov. 16, 1999, 58 pages.

"XML Path Language (XPath)" Version 1.0, W3C Recommendation Nov. 16, 1999, 33 pages.

* cited by examiner

```
-- GET_PAYROLL_TABLES: Fetch DDL for payroll tables and their indexes.

PROCEDURE  get_payroll_tables IS tableOpenHandle    NUMBER;     ⎫
indexOpenHandle    NUMBER;     ⎬ 203
tableTransHandle   NUMBER;     ⎪
indexTransHandle   NUMBER;     ⎭
schemaName         VARCHAR2(30);  ⎫ 205
tableName          VARCHAR2(30);  ⎭
tableDDLs          sys.ku$_ddls;   ⎫
tableDDL           sys.ku$_ddl;    ⎬ 207
parsedItems        sys.ku$_parsed_items;  ⎭
indexDDL           CLOB;
                                       209
BEGIN -- open the output file... note that the 1st param. (dir. path) must be      ⎫
-- included in the database's UTL_FILE_DIR.init. parameter.                  ⎪
--                                                                           ⎪
  BEGIN                                                                      ⎬ 211
    fileHandle := utl_file.fopen('/private/xml', 'ddl.out', 'w', 32760);     ⎪
  EXCEPTION                                                                  ⎪
    WHEN OTHERS THEN                                                         ⎪
        RAISE file_not_found;                                                ⎭
  END;

-- Open a handle for tables in the current schema.
   tableOpenHandle := dbms_metadata.open('TABLE');    213

-- Tell mdAPI to retrieve one table at a time. This call is not actually
-- necessary since 1 is the default.
   dbms_metadata.set_count(tableOpenHandle, 1);    215

-- Retrieve tables whose name starts with 'PAYROLL'. When the filter is
-- 'NAME_EXPR', the filter value string must include the SQL operator. This
-- gives the caller flexibility to use LIKE, IN, NOT IN, subqueries, etc.
   dbms_metadata.set_filter(tableOpenHandle, 'NAME_EXPR', 'LIKE ''PAYROLL%''');   217

-- Tell the mdAPI to parse out each table's schema and name separately so we
-- can use them to set up the calls to retrieve its indexes.
   dbms_metadata.set_parse_item(tableOpenHandle, 'SCHEMA');   219
   dbms_metadata.set_parse_item(tableOpenHandle, 'NAME');   221

-- Add the DDL transform so we get SQL creation DDL
   tableTransHandle := dbms_metadata.add_transform(tableOpenHandle, 'DDL'),223

-- Tell the XSL stylesheet we don't want physical storage information (storage,
-- tablespace, etc), and that we want a SQL terminator on each DDL. Notice that
-- these calls use the transform, not open handle.              ⎫
   dbms_metadata.set_transform_param(tableTransHandle,          ⎪
                         'SEGMENT_ATTRIBUTES', FALSE);          ⎬ 225
   dbms_metadata.set_transform_param(tableTransHandle,          ⎪
                         'SQLTERMINATOR', TRUE);                ⎭
201
```

FIG. 2A

```
-- Ready to start fetching tables. We use the FETCH_DDL interface
(rather than
-- FETCH_XML or FETCH_CLOB). This interface returns a
SYS.KU$_DDLS; a table of
-- SYS.KU$_DDL objects. This is a table because some object types
return
-- multiple DDL statements (like types / pkgs which have create
header and
-- body statements). Each KU$_DDL has a CLOB containing the
'CREATE foo'
-- statement plus a nested table of the parse items specified. In
our case,
-- we asked for two parse items; Schema and Name.
  LOOP
     tableDDLs := dbms_metadata.fetch_ddl(tableOpenHandle);    229
     EXIT WHEN tableDDLs IS NULL;   -- Get out when no more     231
payroll tables -- In our case, we know there is only one row in tableDDLs (a
KU$_DDLS tbl obj)
-- for the current table. Sometimes tables have multiple DDL
statements;
-- eg, if constraints are applied as ALTER TABLE statements, but
we didn't ask
-- for that option. So, rather than writing code to loop through
tableDDLs, we'll
-- just work with the 1st row. First, write the CREATE TABLE text
to our
-- output file and retrieve the parsed schema and table names.
     tableDDL := tableDDLs(1);
     write_lob(tableDDL.ddltext);              233
     parsedItems := tableDDL.parsedItems;

-- Must check the name of the returned parse items as ordering
isn't guaranteed
     FOR i IN 1..2 LOOP
       IF parsedItems(i).item = 'SCHEMA'
       THEN
          schemaName := parsedItems(i).value;     235
       ELSE
          tableName  := parsedItems(i).value;
       END IF;
     END LOOP;
           201
```

FIG. 2B

```
-- Then use the schema and table names to set up a 2nd stream
for retrieval of
-- the current table's indexes
      indexOpenHandle := dbms_metadata.open('INDEX');      239 dbms_metadata.set_filter(indexOpenHandle,'BASE_OBJECT_SCHEMA',   241
schemaName);

dbms_metadata.set_filter(indexOpenHandle,'BASE_OBJECT_NAME',ta   243
bleName);

-- Add the DDL transform and set the same transform options we
did for tables
      indexTransHandle :=                                  245
dbms_metadata.add_transform(indexOpenHandle, 'DDL');
      dbms_metadata.set_transform_param(indexTransHandle,  247
                          'SEGMENT_ATTRIBUTES', FALSE);
      dbms_metadata.set_transform_param(indexTransHandle,  249
                          'SQLTERMINATOR', TRUE);

-- Retrieve index DDLs as CLOBs and write them to the output
file.
      LOOP
         indexDDL := dbms_metadata.fetch_clob(indexOpenHandle);
         EXIT WHEN indexDDL IS NULL;                       251
         write_lob(indexDDL);
      END LOOP;

-- Free resources allocated for index stream.
      dbms_metadata.close(indexOpenHandle);

END LOOP;

-- Free resources allocated for table stream and close output
file.
      dbms_metadata.close(tableOpenHandle);   253
      utl_file.fclose(fileHandle);
      RETURN;

END;   -- of procedure get_payroll_tables
```

227 brackets the block from indexOpenHandle declaration through END LOOP.

| Type name | Meaning | Schema Object? | Notes |
|---|---|---|---|
| FUNCTION | stored functions | | |
| INDEX | indexes | | |
| INDEXTYPE | indextypes | | |
| OBJECT_GRANT | object grants | | Not a named object. |
| OPERATOR | operators | | |
| OUTLINE | stored outlines | N | |
| PACKAGE | stored packages | | By default, both package specification and package body are retrieved. See SET_FILTER, below. |
| PROCEDURE | stored procedures | | |
| SYSTEM_GRANT | system privilege or role grants | N | Not a named object. |
| TABLE | tables | | |
| TABLESPACE | tablespaces | N | |
| TRIGGER | triggers | | |
| TYPE | user-defined types | | By default, both type and type body are retrieved. See SET_FILTER, below. |
| VIEW | views | | |

| Object Type | Name | Datatype | Meaning |
|---|---|---|---|
| Named objects | NAME | text | Objects with this exact name are selected. |
| | NAME_EXPR | text | The filter value is the right-hand side of a SQL comparison, i.e., a SQL comparison operator (=, !=, etc.) and the value compared against. The value must contain parentheses and quotation marks where appropriate. In particular, two single quotes (not a double quote) are needed to represent an apostrophe. E.g., <br><br>' IN (''DEPT'',''EMP'')'<br><br>The filter value is combined with the object attribute corresponding to the object name to produce a WHERE condition in the query that fetches the objects. In the example above, objects named 'DEPT' and 'EMP' are retrieved.<br><br>By default, all named objects of the object_type are selected. |
| Schema objects | SCHEMA | text | Objects in this schema are selected. |
| | SCHEMA_EXPR | text | The filter value is the right-hand side of a SQL comparison. The filter value is combined with the object attribute corresponding to the object's schema to produce a WHERE condition in the query that fetches the objects. See 'NAME_EXPR', above, for syntax details.<br><br>By default, only objects in the current schema are selected. See "Security," below. |
| PACKAGE, TYPE | SPECIFICATION | boolean | If TRUE, retrieve the package or type specification. Defaults to TRUE. |
| | BODY | boolean | If TRUE, retrieve the package or type body. Defaults to TRUE. |
| TABLE | TABLESPACE | text | Tables in this tablespace (or having this as their default tablespace) are selected. |
| | TABLESPACE_EXPR | text | The filter value is the right-hand side of a SQL |

| | | | comparison. The filter value is combined with the object attribute corresponding to the object's tablespace or default tablespace to produce a WHERE condition in the query that fetches the objects. See 'NAME_EXPR', above, for syntax details.<br><br>By default, objects in all tablespaces are selected. |
|---|---|---|---|
| INDEX, OBJECT_GRANT, TRIGGER | BASE_OBJECT_NAME | text | Indexes, triggers or privileges are selected that are defined/granted on objects with this name.<br>Specify 'SCHEMA' for triggers on schemas.<br>Specify 'DATABASE' for database triggers. |
| | BASE_OBJECT_SCHEMA | text | Indexes, triggers or privileges are selected that are defined/granted on objects in this schema. |
| OBJECT_GRANT, SYSTEM_GRANT | GRANTEE | text | Privileges are selected that are granted to this user or role.<br>Specify 'PUBLIC' for grants to PUBLIC. |
| | GRANTOR | text | Privileges are selected that are granted by this user. |
| All objects | CUSTOM_FILTER | text | The text of a WHERE condition. The condition is appended to the query that fetches the objects.<br>By default, no custom filter is used.<br><br>CUSTOM_FILTER is an escape hatch to be resorted to when the defined filters don't do the job. Of necessity such a filter depends on the detailed structure of the UDTs and views in the query. Since these may change from version to version, upward compatibility is not guaranteed. |

| Object type | Table Type | Filter Data Type | Meaning |
|---|---|---|---|
| TABLE | RELATIONAL | boolean | If TRUE, retrieve relational tables.<br>Defaults to TRUE. |
| | OBJECT | boolean | If TRUE, retrieve object tables.<br>Defaults to TRUE.<br><br>'RELATIONAL' and 'OBJECT' are disjoint sets. A table is either one or the other. If both filters are set to FALSE, no tables will be retrieved. |
| | PARTITIONED | boolean | If TRUE, retrieve partitioned tables.<br>Defaults to TRUE. |
| | NON_PARTITIONED | boolean | If TRUE, retrieve non-partitioned tables.<br>Defaults to TRUE.<br><br>'PARTITIONED' and 'NON_PARTITIONED' are disjoint sets. A table is either one or the other. If both filters are set to FALSE, no tables will be retrieved. |
| | HEAP | boolean | If TRUE, retrieve heap tables.<br>Defaults to TRUE. |
| | IOT | boolean | If TRUE, retrieve index-organized tables.<br>Defaults to TRUE.<br><br>'HEAP' and 'IOT' are disjoint sets. A table is either one or the other. If both filters are set to FALSE, no tables will be retrieved. |
| | LOB_COL | boolean | If TRUE, retrieve tables with LOB columns.<br>Defaults to TRUE. |

| Object type | Table Type | Filter Data Type | Meaning |
|---|---|---|---|
| TABLE | UDT_COL | boolean | If TRUE, retrieve tables with UDT columns (types and collections.)<br><br>Defaults to TRUE.<br><br>'LOB_COL' and 'UDT_COL' control the complexity of the per-column data retrieved. If both filters are set to FALSE, only tables containing exclusively columns of built-in, non-LOB datatypes (NUMBER, CHAR, etc.) are retrieved. This often improves retrieval performance. |
|  | INCOMPLETE | boolean | If TRUE, retrieve nested tables and overflow segments as separate objects. These are not complete tables; they cannot be created in isolation, but are instead created when a containing table is created. (When the containing table is retrieved, so is the metadata for its nested tables and overflow segments.)<br><br>Defaults to FALSE. |

| Object Type | Name | Meaning |
|---|---|---|
| All objects | VERB | For every row in the sys.ku$_ddls nested table returned by *fetch_ddl* the verb in the corresponding *ddlText* is returned. If *fetch_xml* is called, NULL is returned. |
| | OBJECT_TYPE | The object type as used in a DDL "CREATE" statement is returned, e.g., "TABLE," "PACKAGE BODY," etc. |
| | SCHEMA | The object's schema is returned. If the object is not a schema object, NULL is returned. |
| | NAME | The object's name is returned. If the object is not a named object, NULL is returned. |
| TABLE, INDEX | TABLESPACE | The name of the table's or index's tablespace or default tablespace is returned. |
| TRIGGER | ENABLE | If the trigger is enabled, "ENABLE" is returned. If the trigger is disabled, "DISABLE" is returned. |

| Object Type | Name | Datatype | Meaning |
|---|---|---|---|
| All objects | PRETTY | boolean | If TRUE, format the output with indentation and line feeds.<br>Defaults to TRUE. |
| | SQLTERMINATOR | boolean | If TRUE, append a SQL terminator (';' or '/') to each DDL statement.<br>Defaults to FALSE. |
| TABLE | SEGMENT_ATTRIBUTES | boolean | If TRUE, emit segment attributes (physical attributes, storage attributes, tablespace, logging). Defaults to TRUE. |
| | STORAGE | boolean | If TRUE, emit storage clause. (Ignored if SEGMENT_ATTRIBUTES is FALSE.)<br>Defaults to TRUE. |
| | TABLESPACE | boolean | If TRUE, emit tablespace. (Ignored if SEGMENT_ATTRIBUTES is FALSE.)<br>Defaults to TRUE. |
| | CONSTRAINTS | boolean | If TRUE, emit all non-referential table constraints.<br>Defaults to TRUE. |
| | REF_CONSTRAINTS | boolean | If TRUE, emit all referential constraints (foreign key and scoped refs).<br>Defaults to TRUE. |
| | CONSTRAINTS_AS_ALTER | boolean | If TRUE, emit table constraints as separate ALTER TABLE (and, if necessary, CREATE INDEX) statements. If FALSE, specify table constraints as part of the CREATE TABLE statement.<br>Defaults to FALSE. |
| TABLE | OID | boolean | If TRUE, emit the OID clause for object tables.<br>Defaults to FALSE. |
| INDEX | SEGMENT_ATTRIBUTES | boolean | If TRUE, emit segment attributes (physical attributes, storage attributes, tablespace, logging).<br>Defaults to TRUE. |
| | STORAGE | boolean | If TRUE, emit storage clause. (Ignored if SEGMENT_ATTRIBUTES is FALSE.)<br>Defaults to TRUE. |
| | TABLESPACE | boolean | If TRUE, emit tablespace. (Ignored if SEGMENT_ATTRIBUTES is FALSE.)<br>Defaults to TRUE. |

| Object Type | Name | Datatype | Meaning |
|---|---|---|---|
| TYPE | SPECIFICATION | boolean | If TRUE, emit the type specification. Defaults to TRUE. |
| | BODY | boolean | If TRUE, emit the type body. Defaults to TRUE. |
| | OID | boolean | If TRUE, emit the OID clause. Defaults to FALSE. |
| PACKAGE | SPECIFICATION | boolean | If TRUE, emit the package specification. Defaults to TRUE. |
| | BODY | boolean | If TRUE, emit the package body. Defaults to TRUE. |
| VIEW | FORCE | boolean | If TRUE, use the FORCE keyword in the CREATE VIEW statement. Defaults to TRUE. |
| OUTLINE | INSERT | boolean | If TRUE, emit the INSERT statements into the OL$ dictionary tables that will create the outline and its hints. If FALSE, emit a CREATE OUTLINE statment. Defaults to FALSE. |
| All objects | DEFAULT | boolean | Calling SET_TRANSFORM_PARAM with this parameter set to TRUE has the effect of resetting all parameters for the transform to their default values. Setting this FALSE has no effect. There is no default. |
| | INHERIT | boolean | If TRUE, inherit session-level parameters. Defaults to FALSE, i.e., if an application calls ADD_TRANSFORM to add the "DDL" transform, then by default the only transform parameters that apply are those explicitly set for that transform handle. This has no effect if the transform handle is the session transform handle. |

```
CREATE TYPE sys.ku$_parsed_item AS OBJECT (
                    item        VARCHAR2(30),        ⎫
                    value       VARCHAR2(4000),      ⎬  803
                    parent      NUMBER );            ⎭

CREATE TYPE sys.ku$_parsed_items IS TABLE OF sys.ku$_parsed_item;    805

CREATE TYPE sys.ku$_ddl AS OBJECT (                                  ⎫
                    ddlText     CLOB,                                ⎬  807
                    parsedItems                                      
                    sys.ku$_parsed_items );                          ⎭

CREATE TYPE sys.ku$_ddls IS TABLE OF sys.ku$_ddl;    809

CREATE TYPE sys.ku$_SubmitError IS OBJECT (          ⎫
                    statement    CLOB,               ⎪
                    errorNumber  NUMBER,             ⎬  811
                    errorText    CLOB );             ⎭

CREATE TYPE sys.ku$_SubmitErrors IS TABLE OF sys.ku$_SubmitError;    813

```
create table metaview$          /* metadata UDT/view table */
( type varchar2("M_IDEN") not null,     /* object type */    903
  flags number not null,                /* object flags */
  properties number not null,           /* object flags */
  model varchar2("M_IDEN") not null,    /* model properties */  905
  version varchar2("M_IDEN"),           /* version */          906
  xmltag varchar2("M_IDEN"),            /* xml tag */          907
  udt   varchar2("M_IDEN") not null,    /* UDT name */         909
  schema varchar2("M_IDEN"),            /* view schema */  ⎫
  viewname varchar2("M_IDEN") not null  /* view name */    ⎬ 911
)                                                          ⎭
901 create table metafilter$ /* maps filters in mdAPI to UDT attributes */
(
  filter varchar2("M_IDEN") not null,   /* documented filter. name */ 915
  type varchar2("M_IDEN") not null,  /* dict. obj type: e.g, 'TABLE' */ 903
  model    varchar2("M_IDEN") not null,        /* model name */    905
  properties number not null,      * filter properties */         ⎫
                                   /* 0x01 = boolean filter,      ⎪
                                      0x02 = expression filter */ ⎬ 917
                                   /* 0x04 = custom filter,       ⎪
                                      0x08 = has default      */  ⎭
  view_attr number not null,  /* view flag bits (boolean filters only) */
  attrname varchar2(2000),    /* filtering attribute */ 919
  default_val  number
(
913
```

FIG. 9A

```
create table metaxsl$              /* metadata xsl table */
( xmltag   varchar2("M_IDEN") not null,        /* xml tag */         907
  transform varchar2("M_IDEN") not null,/* transform name */  923
  model     varchar2("M_IDEN") not null,     /* model name */    905
  script varchar2(2000) not null     /* URI of xsl script */    925
)
```
921

```
create table metaxslparam$    /*legal parameters for mdAPI's XSL scripts*/
(
  model       varchar2("M_IDEN") not null,  /* model name */     929
  transform   varchar2("M_IDEN") not null,  /* transform name */ 931
  type        varchar2("M_IDEN") not null,  /* type: e.g, 'TABLE' */  903
  param       varchar2("M_IDEN") not null,  /* param. name */    933
  default_val varchar2(2000)
)
```
927

```
create table metastylesheet         /* Storage for XSL stylesheets */
( name       varchar2("M_IDEN") not null,    /* stylesheet name */  937
  model      varchar2("M_IDEN") not null,         /* model */       939
  stylesheet clob                            /* stylesheet body */  941
)
```
935

FIG. 9B

```
create or replace type ku$_table_t as object
(
    db_version      varchar2(14),       /* database version number */    1002
    major_version   number,             /* UDT major version number */ ⎱ 1003
    minor_version   number,             /* UDT minor version number */ ⎰
    obj_num         number,             /* obj# */    1005
    schema_obj      ku$_schemaobj_t,    /* schema object */   1007
    storage         ku$_storage_t,      /* storage */   1009
    ts_name         varchar2(30),       /* tablespace name */  1011
    dataobj_num     number,             /* data layer object# */
    bobj_num        number,             /* base obj# (cluster/iot) */
    tab_num         number,             /* # in cluster, null if
                                             !clustered */
    cols            number,             /* # of columns */
    clucols         number,             /* # of clustered cols,
                                             if clustered */
    pct_free        number,             /* min. free space %age
                                             in a block */
    pct_used        number,             /* min. used space %age
                                             in a block */
    initrans        number,             /* init number of transaction */
    maxtrans        number,             /* max number of transaction */       1012
    flags           number,             /* flags */
    audit_val       varchar2(38),       /* auditing options */
    rowcnt          number,             /* number of rows */
    blkcnt          number,             /* number of blocks */
    empcnt          number,             /* number of empty blocks */
    avgspc          number,             /* avg available free space */
    chncnt          number,             /* number of chained rows */
    avgrln          number,             /* average row length */
    avgspc_flb      number,             /* avg avail free space of
                                             blocks on free list */
    flbcnt          number,             /* free list block count */
1001
```

FIG. 10A

```
analyzetime    date,              /* timestamp when last analyzed */
samplesize     number,            /* number of rows sampled by
                                     Analyze */
degree         number,            /* # of PQ slaves per instance */
instances      number,            /* # of OPS instances for PQ */
intcols        number,            /* # of internal columns */
kernelcols     number,            /* number of REAL (kernel)
                                     columns */
property       number,            /* table properties */
trigflag       number,            /* inline trigger flags */
spare1         number,            /* used to store hakan_kqldtvc */
spare2         number,            /* committed partition # used by
                                     drop column */
spare3         number,            /* summary sequence number */
spare4         varchar2(1000),    /* committed RID used by drop
                                     column */
spare5         varchar2(1000),
spare6         date,              /* dml timestamp */ col_list       ku$_column_list_t,     /* list of columns */     1013
con_list       ku$_constraint_list_t, /* list of constraints */ 1015
part_obj       ku$_part_obj_t         /* null if !partitioned */ 1017
)
1001
```

```
create or replace force view ku$_table_view of ku$_table_t  ⎫ 1102
    with object OID(obj_num)                                 ⎭ as select
    ⎛ '08.02.00.00.00', 1, 0,  1104
    ⎜ t.obj#, value(o), value(s),  1105
    ⎜     (select ts.name from ku$_tablespace_view ts   ⎫ 1107
    ⎜         where t.ts# = ts.ts_num),                 ⎭
    ⎜ t.dataobj#, t.bobj#, t.tab#, t.cols,                          ⎫
    ⎜ t.clucols, t.pctfree$, t.pctused$, t.initrans, t.maxtrans, t.flags, ⎪
    ⎜ t.audit$, t.rowcnt, t.blkcnt, t.empcnt, t.avgspc, t.chncnt,        ⎬ 1109
    ⎜ t.avgrln, t.avgspc_flb, t.flbcnt, t.analyzetime, t.samplesize,    ⎪
    ⎜ t.degree, t.instances, t.intcols, t.kernelcols, t.property,       ⎪
    ⎜ t.trigflag, t.spare1, t.spare2, t.spare3, t.spare4, t.spare5,     ⎭
    ⎜ t.spare6,
1103⎨
    ⎜ cast( multiset(select * from ku$_column_view c    ⎫
    ⎜     where c.obj_num = t.obj#)                      ⎬ 1111
    ⎜         as ku$_column_list_t),                     ⎭
    ⎜
    ⎜ cast( multiset(select * from ku$_constraint_view con ⎫
    ⎜     where con.obj_num = t.obj#)                      ⎬ 1113
    ⎜         as ku$_constraint_list_t),                   ⎭
    ⎜
    ⎝ (select value(po) from ku$_part_obj_view po
        where t.obj# = po.obj_num)
    from tab$ t, ku$_schemaobj_view o, ku$_storage_view s          ⎫
        where t.obj# = o.obj_num(+)   1117                          ⎪
        ⎧ AND    t.file#  = s.file_num(+)  ⎫                        ⎪
        ⎪ AND    t.block# = s.block_num(+) ⎬ 1119                   ⎬ 1115
  1116 ⎨ AND    t.ts#    = s.ts_num(+)    ⎭                        ⎪
        ⎪ AND    (UID IN (o.owner_num, 0)                  ⎫        ⎪
        ⎪ OR     EXISTS ( SELECT * FROM session_roles      ⎬ 1121   ⎪
        ⎩         WHERE role='SELECT_CATALOG_ROLE' ))      ⎭        ⎭
                            1101
```

FIG. 11

1203 { CREATE TABLE "SCOTT"."BONUS" 1205
       (    "ENAME" VARCHAR2(10),   1209 ⎤
            "JOB" VARCHAR2(9),           |
            "SAL" NUMBER,                ⎬ 1207
            "COMM" NUMBER                |
       )                             ⎦

1211 { PCTFREE 10 PCTUSED 40 INITRANS 1 MAXTRANS 255  1213
       STORAGE(INITIAL 10240 NEXT 10240 MINEXTENTS 1 ⎤
       MAXEXTENTS 121 PCTINCREASE 50 FREELISTS 1      ⎬ 1215
       FREELIST GROUPS 1 BUFFER_POOL DEFAULT)        ⎦
       TABLESPACE "SYSTEM";  1217

```
<TABLE_T>  1303
                                              (1002)
<DB_VERSION>08.02.00.00.00</DB_VERSION>
  <MAJOR_VERSION>1</MAJOR_VERSION>  ⎤
                                    ⎬ (1003)
  <MINOR_VERSION>0</MINOR_VERSION>  ⎦
  <OBJ_NUM>2894</OBJ_NUM>  (1005)
  <SCHEMA_OBJ>
    <OBJ_NUM>2894</OBJ_NUM>
    <DATAOBJ_NUM>2894</DATAOBJ_NUM>
    <OWNER_NUM>19</OWNER_NUM>
    <OWNER_NAME>SCOTT</OWNER_NAME>
    <NAME>BONUS</NAME>
    <NAMESPACE>1</NAMESPACE>
    <TYPE_NUM>2</TYPE_NUM>                      (1007)
    <CTIME>1999-05-14 15:56:16.0</CTIME>
    <MTIME>1999-05-14 15:56:16.0</MTIME>
    <STIME>1999-05-14 15:56:16.0</STIME>
    <STATUS>1</STATUS>
    <FLAGS>0</FLAGS>
  </SCHEMA_OBJ>
  <STORAGE>
    <FILE_NUM>1</FILE_NUM>
    <BLOCK_NUM>21345</BLOCK_NUM>
    <TYPE_NUM>5</TYPE_NUM>
    <TS_NUM>0</TS_NUM>
    <BLOCKS>5</BLOCKS>
    <EXTENTS>1</EXTENTS>
    <INIEXTS>5</INIEXTS>
    <MINEXTS>1</MINEXTS>                        (1009)
    <MAXEXTS>121</MAXEXTS>
    <EXTSIZE>5</EXTSIZE>
    <EXTPCT>50</EXTPCT>
    <USER_NUM>19</USER_NUM>
    <LISTS>1</LISTS>
    <GROUPS>1</GROUPS>
    <BITMAPRANGES>0</BITMAPRANGES>
    <CACHEHINT>0</CACHEHINT>
         1301
```

FIG. 13A

```
<SCANHINT>0</SCANHINT>  ⎫                    . . .
<HWMINCR>0</HWMINCR>    ⎬ (1009)        </COL_LIST>  (1013)
</STORAGE>              ⎭               </TABLE_T>   1303
<TS_NAME>SYSTEM</TS_NAME>  (1011)
<DATAOBJ_NUM>2894</DATAOBJ_NUM>  ⎫
<COLS>4</COLS>
<PCT_FREE>10</PCT_FREE>
<PCT_USED>40</PCT_USED>
<INITRANS>1</INITRANS>
<MAXTRANS>255</MAXTRANS>
<FLAGS>1</FLAGS>
<AUDIT_VAL>--------------</AUDIT_VAL>  ⎬ (1012)
<INTCOLS>4</INTCOLS>
<KERNELCOLS>4</KERNELCOLS>
<PROPERTY>0</PROPERTY>
<TRIGFLAG>0</TRIGFLAG>
<SPARE1>178</SPARE1>
<SPARE3>0</SPARE3>   ⎭
<COL_LIST>  (1013)
  <COL_LIST_ITEM itemNo="1">  ⎫
    <OBJ_NUM>2894</OBJ_NUM>
    <COL_NUM>1</COL_NUM>
    <SEGCOL_NUM>1</SEGCOL_NUM>
    <SEGCOLLENGTH>10</SEGCOLLENGTH>
    <OFFSET>0</OFFSET>
    <NAME>ENAME</NAME>
    <TYPE_NUM>1</TYPE_NUM>
    <LENGTH>10</LENGTH>              ⎬ 1305 (1013)
    <FIXEDSTORAGE>0</FIXEDSTORAGE>
    <IS_NULL>0</IS_NULL>
    <INTCOL_NUM>1</INTCOL_NUM>
    <PROPERTY>0</PROPERTY>
    <CHARSETID>2</CHARSETID>
    <CHARSETFORM>1</CHARSETFORM>
    <SPARE1>0</SPARE1>
    <SPARE2>0</SPARE2>
  </COL_LIST_ITEM>  . . .  ⎭
         1301
```

FIG. 13B

```
<xsl:template match="COL_LIST"> 1403
  <xsl:text>         1405
  (</xsl:text>
  <xsl:for-each select="COL_LIST_ITEM">
    <xsl:sort select="COL_NUM"/> 1409
    <xsl:text>    "</xsl:text>  1411
    <xsl:value-of select="NAME"/> 1413
    <xsl:text>" </xsl:text>
    <xsl:if test="$UDT_type='TABLE'"> 1415
      <xsl:apply-templates select="TYPE_NUM"/> 1417
    </xsl:if>
    <xsl:choose>
      <!-- Put out a comma / LF if not the last col -->
      <xsl:when test="not(position()=last())">
        <xsl:text>,    1437
</xsl:text>
      </xsl:when>
      <xsl:otherwise>
        ) </xsl:otherwise>   1439
    </xsl:choose>
  </xsl:for-each>
</xsl:template>  1403

<xsl:template match="TYPE_NUM">  1421
  <xsl:choose>
    <xsl:when test=".='1'">
      <xsl:text>VARCHAR2</xsl:text>
      <xsl:apply-templates select="../LENGTH"/>  1427
    </xsl:when>
    <xsl:when test=".='2'">
      <xsl:choose>
        <xsl:when test="(../PRECISION_NUM) and not(../SCALE)">FLOAT</xsl:when>
        <xsl:otherwise>NUMBER</xsl:otherwise>
      </xsl:choose>
      <xsl:apply-templates select="../PRECISION_NUM"/>
    </xsl:when>
    <xsl:when test=".='8'">LONG</xsl:when>
```

```
        <xsl:when test=".='12'">DATE</xsl:when>
        <xsl:when test=".='23'">
          <xsl:text>RAW</xsl:text>
          <xsl:apply-templates select="../LENGTH"/>
        </xsl:when>
        <xsl:when test=".='24'">LONG RAW</xsl:when>
        <xsl:when test=".='69'">ROWID</xsl:when>
        <xsl:when test=".='96'">
          <xsl:text>CHAR</xsl:text>
          <xsl:apply-templates select="../LENGTH"/>
        </xsl:when>
        <xsl:when test=".='105'">MLSLABEL</xsl:when>
        <xsl:when test=".='112'">CLOB</xsl:when>
        <xsl:when test=".='113'">BLOB</xsl:when>
        <xsl:when test=".='114'">BFILE</xsl:when>
        <xsl:otherwise>OTHER</xsl:otherwise>
      </xsl:choose>
      <xsl:if test="../IS_NULL='1'">
        <xsl:text> NOT NULL</xsl:text>
      </xsl:if>
</xsl:template>  1421

<!-- This template used for both VARCHAR2(n), RAW(n), NUMBER(x,y) and
FLOAT(z)
     OK for
     VARCHARs because SCALE will not be present
-->
<xsl:template match="PRECISION_NUM | LENGTH">  1429
  <xsl:text>(</xsl:text>  1431
  <xsl:value-of select="."/>  1433
      <xsl:if test = "(../SCALE) and not(../SCALE='0')">
        <xsl:text>,</xsl:text>
        <xsl:value-of select="../SCALE"/>
      </xsl:if>
  <xsl:text>)</xsl:text>  1435
</xsl:template>  1429
                    1401
```

FIG. 14B

| 1603(1) | 1603(2) | 1603(3) | 1603(4) |
|---|---|---|---|
| Col. name: A<br>Type: number<br>Constr: not null | Col. name: B<br>Type: number<br>Constr: prim. key | Col. name: C<br>Type: number<br>Constr; unique | Col. name: D<br>Type: number<br>Constr: =5 |
| 1605(i,1) | 1605(i,2) | 1605(i,3) | 1605(i,4) |
|  |  |  |  |

SCOTT.CONSTR_TAB 1601

```
1609 CREATE TABLE "SCOTT"."CONSTR_TAB"                              1613
       ┌─(   "A" NUMBER CONSTRAINT "NN" NOT NULL ENABLE,─
1611  ─┤     "B" NUMBER,
       │     "C" NUMBER,
       └─    "D" NUMBER, CONSTRAINT "CK" CHECK (d = 5) ⎫
             ENABLE, CONSTRAINT "PK" PRIMARY KEY ("B") ⎬ 1615
             ENABLE, CONSTRAINT "UK" UNIQUE ("C") ENABLE ⎭
         )
```

```
1  <ROWSET>
2    <ROW>
3      <TABLE_T>
4        <VERS_MAJOR>1</VERS_MAJOR>
5        <VERS_MINOR>0 </VERS_MINOR>
6        <OBJ_NUM>43229</OBJ_NUM>
7        <SCHEMA_OBJ>
8          <OBJ_NUM>43229</OBJ_NUM>
9          <DATAOBJ_NUM>43229</DATAOBJ_NUM>
10         <OWNER_NUM>30</OWNER_NUM>
11  1709   <OWNER_NAME>SCOTT</OWNER_NAME>
12  1711   <NAME>CONSTR_TAB</NAME>
13         <NAMESPACE>1</NAMESPACE>
14         <TYPE_NUM>2</TYPE_NUM>
15         <TYPE_NAME>TABLE</TYPE_NAME>
16         <CTIME>2004-04-19:11:17:09</CTIME>
17         <MTIME>2004-04-19:11:17:09</MTIME>
18         <STIME>2004-04-19:11:17:09</STIME>
19         <STATUS>1</STATUS>
20         <FLAGS>0</FLAGS>
21         <SPARE1>6</SPARE1>
22         <SPARE2>1</SPARE2>
23       </SCHEMA_OBJ>
24       <STORAGE>
25         <FILE_NUM>1</FILE_NUM>
26         <BLOCK_NUM>41776</BLOCK_NUM>
27         <TYPE_NUM>5</TYPE_NUM>
28         <TS_NUM>0</TS_NUM>
29         <BLOCKS>2</BLOCKS>
30         <EXTENTS>1</EXTENTS>
31         <INIEXTS>2</INIEXTS>
32         <MINEXTS>1</MINEXTS>
33         <MAXEXTS>505</MAXEXTS>
34         <EXTSIZE>2</EXTSIZE>
35         <EXTPCT>50</EXTPCT>
36         <USER_NUM>30</USER_NUM>
37         <LISTS>1</LISTS>
38         <GROUPS>1</GROUPS>
39         <BITMAPRANGES>0</BITMAPRANGES>
40         <CACHEHINT>0</CACHEHINT>
41         <SCANHINT>0</SCANHINT>
42         <HWMINCR>43229</HWMINCR>
43         <FLAGS>132096</FLAGS>
44       </STORAGE>
45       <TS_NAME>SYSTEM</TS_NAME>
46       <BLOCKSIZE>8192</BLOCKSIZE>
47       <DATAOBJ_NUM>43229</DATAOBJ_NUM>
```

```
48      <COLS>4</COLS>
49      <PCT_FREE>10</PCT_FREE>
50      <PCT_USED>40</PCT_USED>
51      <INITRANS>1</INITRANS>
52      <MAXTRANS>255</MAXTRANS>
53      <FLAGS>1073741825</FLAGS>
54      <AUDIT_VAL>-------------------------------</AUDIT_VAL>
55      <INTCOLS>4</INTCOLS>
56      <KERNELCOLS>4</KERNELCOLS>
57      <PROPERTY>536870912</PROPERTY>
58      <XMLSCHEMACOLS>N</XMLSCHEMACOLS>
59      <TRIGFLAG>0</TRIGFLAG>
60      <SPARE1>736</SPARE1>
61      <SPARE6>19-APR-04</SPARE6>
62      <COL_LIST>
63         <COL_LIST_ITEM>
64            <OBJ_NUM>43229</OBJ_NUM>
65            <COL_NUM>1</COL_NUM>
66            <INTCOL_NUM>1</INTCOL_NUM>
67            <SEGCOL_NUM>1</SEGCOL_NUM>
68            <PROPERTY>0</PROPERTY>
69          1717<NAME>A</NAME>
70          1719<TYPE_NUM>2</TYPE_NUM>
71            <LENGTH>22</LENGTH>
72          1721<NOT_NULL>1</NOT_NULL>
73            <CHARSETID>0</CHARSETID>
74            <CHARSETFORM>0</CHARSETFORM>
75            <CON>
76               <OWNER_NUM>30</OWNER_NUM>
77               <NAME>NN</NAME>
78               <CON_NUM>2873</CON_NUM>
79               <OBJ_NUM>43229</OBJ_NUM>
80               <NUMCOLS>1</NUMCOLS>
81               <CONTYPE>7</CONTYPE>
82          1723 <ENABLED>1</ENABLED>
83               <INTCOLS>1</INTCOLS>
84               <MTIME>19-APR-04</MTIME>
85               <FLAGS>4</FLAGS>
86            </CON>
87            <SPARE1>0</SPARE1>
88            <SPARE2>0</SPARE2>
89            <SPARE3>0</SPARE3>
90         </COL_LIST_ITEM>
```

FIG. 17B Prior Art

```
 1  <table xmlns="http://xmlns.oracle.com/ku" version="1.0">
 2      <schema>SCOTT</schema>
 3      <name>CONSTR_TAB</name>
 4      <col_list>
 5          <col_list_item>
 6              <name>A</name>
 7              <datatype>NUMBER</datatype>
 8              <not_null>
 9                  <name>NN</name>
10                  <enable></enable>
11              </not_null>
12          </col_list_item>
13          <col_list_item>
14              <name>B</name>
15              <datatype>NUMBER</datatype>
16          </col_list_item>
17          <col_list_item>
18              <name>C</name>
19              <datatype>NUMBER</datatype>
20          </col_list_item> <col_list_item>
21              <name>D</name>
22              <datatype>NUMBER</datatype>
23          </col_list_item>
24      </col_list>
25      <check_constraint_list>
26          <check_constraint_list_item>
27              <name>CK</name>
28              <condition>d = 5</condition>
29              <enable></enable>
30          </check_constraint_list_item> </check_constraint_list>
31      <primary_key_constraint_list>
32          <primary_key_constraint_list_item>
33              <name>PK</name>
34              <col_list>
35                  <col_list_item>
36                      <name>B</name>
37                  </col_list_item>
38              </col_list>
39              <enable></enable>
```

```
73        <storage>
74            <initial>16384</initial>
75            <next>16384</next>
76            <minextents>1</minextents>
77            <maxextents>505</maxextents>
78            <pctincrease>50</pctincrease>
79            <freelists>1</freelists>
80            <freelist_groups>1</freelist_groups>
81            <buffer_pool>DEFAULT</buffer_pool>
82        </storage>
83        <tablespace>SYSTEM</tablespace>
84        <logging>Y</logging>
85      </index_attributes>
86    </using_index>
87   </unique_key_constraint_list_item>
88  </unique_key_constraint_list>
89  <physical_properties>
90    <organization>HEAP</organization>
91    <segment_attributes>
92      <pctfree>10</pctfree>
93      <pctused>40</pctused>
94      <initrans>1</initrans>
95      <storage>
96          <initial>16384</initial>
97          <next>16384</next>
98          <minextents>1</minextents>
99          <maxextents>505</maxextents>
100         <pctincrease>50</pctincrease>
101         <freelists>1</freelists>
102         <freelist_groups>1</freelist_groups>
103         <buffer_pool>DEFAULT</buffer_pool>
104      </storage>
105      <logging>Y</logging>
106    </segment_attributes>
107  </physical_properties>
108 </table>
```

```
<?xml version="1.0" ?>
1903   <!--
       NAME
           kustable.xsl
       DESCRIPTION
           Convert mdapi TABLE_T document to TABLE document (SXML)
       -->
       <xsl:stylesheet version="1.0"
        xmlns:xsl="http://www.w3.org/1999/XSL/Transform">

<!-- Top level imports -->
       <xsl:import href="kuscomm.xsl"/>
       <xsl:import href="kuscnstr.xsl"/>
       <xsl:import href="kustbphy.xsl"/>
       <xsl:import href="kuspar.xsl"/>

<!-- Top-level parameters -->
        <xsl:param name="PHYSICAL_PROPERTIES">1</xsl:param>
        <xsl:param name="SEGMENT_ATTRIBUTES">1</xsl:param>
        <xsl:param name="STORAGE">1</xsl:param>
        <xsl:param name="TABLESPACE">1</xsl:param>
        <xsl:param name="OID">0</xsl:param>

<!-- ****************************************************************
       Template: TABLE_T - top-level template for tables.
         This template puts out
           - the opening TABLE element (with xmlns and version attributes)
           - SCHEMA and NAME elements
         then calls one of
           - CreObjTable - for object tables and XMLType tables
           - CreRelTable - for relational tables
       **************************************************************** -->

<xsl:template match="TABLE_T">
1905    <xsl:element name="TABLE">
          <xsl:attribute name="xmlns">http://xmlns.oracle.com/ku</xsl:attribute>
          <xsl:attribute name="version">1.0</xsl:attribute>

1907      <xsl:if test="(PROPERTY mod 8388608)>=4194304">
           <xsl:element name="GLOBAL_TEMPORARY"/>
          </xsl:if>

1909      <xsl:apply-templates select="SCHEMA_OBJ"/>

<xsl:choose>
           <xsl:when test="(PROPERTY mod 2)=1">        <!-- object or XMLType table -->
            <xsl:call-template name="CreObjTable"/>
1910       </xsl:when>
           <xsl:otherwise>
            <xsl:call-template name="CreRelTable"/>
           </xsl:otherwise>
          </xsl:choose>

</xsl:element>
```

FIG. 19A

```
              </xsl:template>

<!-- *********************************************************************
Template: CreRelTable - processing for relational tables
Current node: TABLE_T
  Emit the following:
    - column list
    - constraints
    - supplemental logging
    - on commit
    - physical properties (non-partitioned tables only)
    - table properties
    - column properties
    - table partitioning
    - CACHE
    - parallel clause
    - row dependencies
    - row movement
********************************************************************* -->
              <xsl:template name="CreRelTable">

<!-- column list -->
                <xsl:element name="COL_LIST">
                  <!-- exclude hidden columns                              - prop bit 0x000020
                       (but do include hidden snapshot base table column  - prop bit 0x100000
                        and do include RLS hidden column                  - prop bit 0x800000)
                  -->
                  <xsl:for-each select="COL_LIST/COL_LIST_ITEM[(PROPERTY mod 64)<32
                                        or (PROPERTY mod 2097152)>=1048576
                                        or (PROPERTY mod 8388608)>=4194304]">

<xsl:element name="COL_LIST_ITEM">
                      <xsl:call-template name="ColumnDefinition"/>
                    </xsl:element>
                  </xsl:for-each>
                </xsl:element>

<!-- constraints -->
          1913  <xsl:call-template name="TableConstraints"/>

<!-- supplemental logging -->
                <xsl:call-template name="SupplementalLogging"/>

<xsl:choose>

<xsl:when test="(PROPERTY mod 8388608)>=4194304">   <!-- temporary table -->

<!-- on commit -->
                    <xsl:call-template name="OnCommit">
                      <xsl:with-param name="Property" select="PROPERTY"/>
                    </xsl:call-template>

</xsl:when>

<xsl:otherwise>

<!-- physical properties (non-partitioned tables only) -->
```

FIG. 19B

```
              <xsl:if test="(PROPERTY mod 64)<32">
         1919 <xsl:call-template name="TablePhysicalProperties"/>
              </xsl:if>

<!-- table properties -->
1911          <xsl:call-template name="TableProperties"/>

</xsl:otherwise>
          </xsl:choose>

</xsl:template>
```

```
<!-- ***********************************************************
Template: SCHEMA_OBJ | BASE_OBJ
 This template puts out SCHEMA and NAME elements
*********************************************************** -->

<xsl:template match="SCHEMA_OBJ | BASE_OBJ">

1925 <xsl:element name="SCHEMA">
     1927   <xsl:value-of select="OWNER_NAME"/>
1923       </xsl:element>
     1929 <xsl:element name="NAME">
     1931   <xsl:value-of select="NAME"/>
            </xsl:element>

</xsl:template>
```

```
<TABLE xmlns="http://xmlns.oracle.com/ku" version="1.0">
      <SCHEMA>SCOTT</SCHEMA>
      <NAME>EMP</NAME>
      <COL_LIST>
            <COL_LIST_ITEM>
                  <NAME>EMPNO</NAME>
                  <DATATYPE>NUMBER</DATATYPE>
                  <PRECISION>4</PRECISION>
                  <SCALE>0</SCALE>
                  <NOT_NULL></NOT_NULL>
            </COL_LIST_ITEM>
            <COL_LIST_ITEM>
                  <NAME>ENAME</NAME>
                  <DATATYPE>VARCHAR2</DATATYPE>
                  <LENGTH>10</LENGTH>
            </COL_LIST_ITEM>
            <COL_LIST_ITEM>                        ─── 2005
                  <NAME>JOB</NAME>
     2003         <DATATYPE>VARCHAR2</DATATYPE>
                  <LENGTH>9</LENGTH>
            </COL_LIST_ITEM>
            <COL_LIST_ITEM>
                  <NAME>MGR</NAME>
                  <DATATYPE>NUMBER</DATATYPE>
                  <PRECISION>4</PRECISION>
                  <SCALE>0</SCALE>
            </COL_LIST_ITEM>
            <COL_LIST_ITEM>
                  <NAME>HIREDATE</NAME>
                  <DATATYPE>DATE</DATATYPE>
            </COL_LIST_ITEM>
            <COL_LIST_ITEM>
                  <NAME>SAL</NAME>
                  <DATATYPE>NUMBER</DATATYPE>
                  <PRECISION>7</PRECISION>
                  <SCALE>2</SCALE>
            </COL_LIST_ITEM>
            <COL_LIST_ITEM>
                  <NAME>COMM</NAME>
                  <DATATYPE>NUMBER</DATATYPE>
                  <PRECISION>7</PRECISION>
                  <SCALE>2</SCALE>
            </COL_LIST_ITEM>
            <COL_LIST_ITEM>
                  <NAME>DEPTNO</NAME>
                  <DATATYPE>NUMBER</DATATYPE>
                  <PRECISION>2</PRECISION>
                  <SCALE>0</SCALE>
            </COL_LIST_ITEM>
      </COL_LIST>
</TABLE>
```

```xml
<TABLE xmlns="http://xmlns.oracle.com/ku" version="1.0">
    <SCHEMA>SCOTT</SCHEMA>
    <NAME>EMP</NAME>
    <COL_LIST>
        <COL_LIST_ITEM>
            <NAME>EMPNO</NAME>
            <DATATYPE>NUMBER</DATATYPE>
            <PRECISION>4</PRECISION>
            <SCALE>0</SCALE>
            <NOT_NULL></NOT_NULL>
        </COL_LIST_ITEM>
        <COL_LIST_ITEM>
            <NAME>ENAME</NAME>
            <DATATYPE>VARCHAR2</DATATYPE>
            <LENGTH>12</LENGTH>
        </COL_LIST_ITEM>
        <COL_LIST_ITEM>                                  — 2103
            <NAME>JOB</NAME>
            <DATATYPE>VARCHAR2</DATATYPE>
            <LENGTH>9</LENGTH>
        </COL_LIST_ITEM>
        <COL_LIST_ITEM>
            <NAME>MGR</NAME>
            <DATATYPE>NUMBER</DATATYPE>
            <PRECISION>4</PRECISION>
            <SCALE>0</SCALE>
        </COL_LIST_ITEM>
        <COL_LIST_ITEM>
            <NAME>HIREDATE</NAME>
            <DATATYPE>DATE</DATATYPE>
        </COL_LIST_ITEM>
        <COL_LIST_ITEM>
            <NAME>SAL</NAME>
            <DATATYPE>NUMBER</DATATYPE>
            <PRECISION>7</PRECISION>
            <SCALE>2</SCALE>
        </COL_LIST_ITEM>
        <COL_LIST_ITEM>
            <NAME>COMM</NAME>
            <DATATYPE>NUMBER</DATATYPE>
            <PRECISION>7</PRECISION>
            <SCALE>2</SCALE>
        </COL_LIST_ITEM>
        <COL_LIST_ITEM>
            <NAME>DEPTNO</NAME>
            <DATATYPE>NUMBER</DATATYPE>
            <PRECISION>2</PRECISION>
            <SCALE>0</SCALE>
        </COL_LIST_ITEM>
    </COL_LIST>
</TABLE>
```

```xml
<TABLE xmlns="http://xmlns.oracle.com/ku" version="1.0">
    <SCHEMA>SCOTT</SCHEMA>
    <NAME>EMP</NAME>
    <COL_LIST>
        <COL_LIST_ITEM>
            <NAME>EMPNO</NAME>
            <DATATYPE>NUMBER</DATATYPE>
            <PRECISION>4</PRECISION>
            <SCALE>0</SCALE>
            <NOT_NULL></NOT_NULL>
        </COL_LIST_ITEM>
        <COL_LIST_ITEM>
            <NAME>ENAME</NAME>
            <DATATYPE>VARCHAR2</DATATYPE>
            <LENGTH value1="10">12</LENGTH>
        </COL_LIST_ITEM>
        <COL_LIST_ITEM src="1">
            <NAME>JOB</NAME>
            <DATATYPE>VARCHAR2</DATATYPE>
            <LENGTH>9</LENGTH>
        </COL_LIST_ITEM>
        <COL_LIST_ITEM>
            <NAME>MGR</NAME>
            <DATATYPE>NUMBER</DATATYPE>
            <PRECISION>4</PRECISION>
            <SCALE>0</SCALE>
        </COL_LIST_ITEM>
        <COL_LIST_ITEM>
            <NAME>HIREDATE</NAME>
            <DATATYPE>DATE</DATATYPE>
        </COL_LIST_ITEM>
        <COL_LIST_ITEM>
            <NAME>SAL</NAME>
            <DATATYPE>NUMBER</DATATYPE>
            <PRECISION>7</PRECISION>
            <SCALE>2</SCALE>
        </COL_LIST_ITEM>
        <COL_LIST_ITEM>
            <NAME>COMM</NAME>
            <DATATYPE>NUMBER</DATATYPE>
            <PRECISION>7</PRECISION>
            <SCALE>2</SCALE>
        </COL_LIST_ITEM>
        <COL_LIST_ITEM>
            <NAME>DEPTNO</NAME>
            <DATATYPE>NUMBER</DATATYPE>
            <PRECISION>2</PRECISION>
            <SCALE>0</SCALE>
        </COL_LIST_ITEM>
    </COL_LIST>
</TABLE>
```

2203 (points to ENAME COL_LIST_ITEM)
2205 (points to JOB COL_LIST_ITEM with src="1")
2201

FIG. 22

| Object Type | Name | Datatype | Meaning |
|---|---|---|---|
| TABLE, INDEX | SEGMENT_ATTRIBUTES | boolean | If TRUE, emit the segment_attributes_clause and the using_index clause. Defaults to TRUE. |
| TABLE, INDEX | PHYSICAL_PROPERTIES | boolean | If TRUE, emit the physical_properties clause and index_attributes clause. Defaults to TRUE. |
| TABLE, INDEX | STORAGE | boolean | If TRUE, emit the storage_clause. Defaults to TRUE. |
| TABLE, INDEX | TABLESPACE | boolean | If TRUE, emit the TABLESPACE element. Defaults to TRUE. |
| TABLE | OID | boolean | If TRUE, emit the OID clause. Defaults to TRUE. |

2401

| Object Type | Name | Datatype | Meaning |
|---|---|---|---|
| TABLE | DROP_MISSING_COLUMNS | boolean | If TRUE, emit "ALTER TABLE DROP COLUMN" for columns in document 1 that are missing in document 2. Defaults to FALSE. |
| TABLE | NOT_NULL_METHOD | text | For columns that are NULL in document 1 and NOT NULL in document 2: If "AUTOMATIC", emit "ALTER TABLE MODIFY (column NOT NULL)". The server will automatically update rows with NULL values to the column default value. This can use much rollback segment space if many rows need updating. If "CUSTOM", emit DML statements to explicitly update rows with NULL values to the column default value; then emit the "ALTER TABLE MODIFY" statement. Defaults to "AUTOMATIC". |

MAKING AND USING ABSTRACT XML REPRESENTATIONS OF DATA DICTIONARY METADATA

CROSS REFERENCE TO RELATED APPLICATIONS

A system for assembling and manipulating metadata contained in a relational database system's data dictionary in which the present invention may be employed is disclosed in U.S. Pat. No. 6,708,186, Claborn, et al., Aggregating and manipulating dictionary metadata in a database system, issued Mar. 16, 2004, and in U.S. Ser. No. 10/014,038, Barton, Database system having heterogeneous object types, filed Dec. 10, 2001 and published as 20030220279 on Jun. 12, 2003. U.S. Pat. No. 6,708,186, U.S. Ser. No. 10/014,038, and the present patent application are all assigned to a common assignee. U.S. Pat. No. 6,708,186 and U.S. Ser. No. 10/014,038 are hereby incorporated by reference into the present application for all purposes. The present patent application contains the entire Detailed description of U.S. Pat. No. 6,708,186. The new material begins with the section, Abstract AML.

BACKGROUND OF THE INVENTION

1. Field of the Invention

The invention relates generally to database systems of the kind which store metadata in catalogs or data dictionaries and more specifically to techniques for reading and manipulating the metadata.

2. Description of Related Art

A preferred embodiment of the invention is implemented in an improved version of the Oracle10g™ Server, manufactured by Oracle Corporation, Redwood City, Calif. The Oracle10g server includes an object-relational database system. The object-relational database system appears in FIG. 1 as DBMS 103; prior to modification as required for the invention, DBMS 103 includes database 108, together with those tables 107 in data dictionary 106 that are required to implement database 108.

Information is stored in DBMS 103 as objects. In FIG. 1, all objects have the reference number 105. Objects are divided into classes according to the kind of information they contain. Shown in FIG. 1 are objects of the TABLE class 141, the TRIGGER class 143, the INDEX class 145, the UDT (user-defined type) class 147, and the VIEW class 149. Many other classes of objects exist as well in DBMS 103. Object classes that are of particular importance for the present discussion are TABLE class 141, UDT class 147, and VIEW class 149.

DBMS 103 is a relational database system. In such systems, most of the data is stored in objects of TABLE class 141. As implied by the name, an object of TABLE class 141 contains a table. The table is made up of rows and columns. Each row has a field for each of the columns. A column specifies a kind of data value and a row represents an entity which has values of the kinds specified by the column. For example, in a table for storing personal information, the columns might be called last_name, first_name, m_i, street_addr, and so forth, with each row representing a person and the fields in the row having the appropriate values for that person.

DBMS 103 is an object relational database system. In such a system, the data values in a column may be objects which have user-defined types or UDTs. For instance, a user might define a type called contact_info which contained fields for all of the contact information for an individual and a column in a table of persons might specify a field for which the values are objects of type contact_info. Objects of class UDT are objects with user-defined types.

The objects of the TABLE class are what is termed base tables, that is, the information contained in an object of the TABLE class is stored as a table in DBMS 103's memory system. DBMS 103 has other tables which use the information contained in one or more base tables, but do not make separate copies of the information. These tables are termed views and the objects that represent views are objects of VIEW class 149. Views can be used to combine information from a number of different base tables and even other views. A kind of view which is of particular interest in the present discussion is an object view. An object view is a view that is associated with a user-defined type. Each row in the table specified by the object view is an object of the user-defined type associated with the object view. The information which the object view obtains from the base tables either directly or via other views is mapped into fields of the objects which make up the rows in the view.

The objects in DBMS 103 belong either to data dictionary 106 or to database 108. The information in data dictionary 106 is metadata, that is, information that defines all of the objects in DBMS 103, those in database 108, and also those in data dictionary 106. In the Oracle8 server, most of the objects in data dictionary 106 are TABLE objects 105 that belong to system tables 107. For example, there is a table named tab$ in system tables 107 that contains a row for every table defined in DBMS 103, including the tables in system tables 107.

U.S. Pat. No. 6,708,186 and U.S. Ser. No. 10/014,038 disclose a system which is termed herein the Metadata API. The Metadata API is a central facility for extracting and manipulating complete representations of the metadata for database objects. It allows one to fetch an object's metadata as XML transform the XML in a variety of ways, including transforming it into SQL DDL submit the XML to recreate the object The Metadata API implements an object type using three entities:

A user-defined type (UDT) whose attributes comprise all the metadata for objects of the type. An object's XML representation is a translation of a type instance into XML, with the XML tag names derived from the type attribute names. (In the case of TABLEs, several UDTs are needed to represent the different varieties of the object type.)

An object view of the UDT which populates instances of the object type.

An XSL script that converts the XML representation of an object into SQL DDL.

Homogeneous Object Types

For the purposes of this API every entity in the database is modeled as an object which belongs to an object type. E.g., the table SCOTT.EMP is an object; its object type is TABLE. When you fetch an object's metadata you must specify the object type.

Object types can be grouped according to their attributes. Schema objects (e.g., tables) belong to schemas. Named objects have unique names; if they are schema objects, the name is unique in the schema. Dependent objects (e.g., indexes) are defined with reference to a base object. Granted objects are granted or assigned to a user or role and therefore have a named grantee.

In order to fetch a particular object or set of objects within an object type, you specify a filter. Different filters are defined for each object type. e.g., two of the filters defined for the TABLE object type are SCHEMA and NAME; they allow you to say that you want the table whose schema is SCOTT and whose name is EMP.

The metadata is returned in an XML document. You can use the API to specify one or more transforms (XSLT scripts) to be applied to the XML, either when the metadata is fetched ("FETCH_xxx"), when it is resubmitted ("PUT"), or simply as a single stand-alone operation ("CONVERT"). The API provides some predefined transforms including one named "DDL" which transforms the XML document into SQL creation DDL. Since the XSLT language permits conditional transformation based on input parameters, you can specify transform parameters for the transforms you have added. e.g., if you have added the DDL transform for a TABLE object you can specify the TABLESPACE transform parameter to indicate whether you want tablespace information to appear in the DDL. remap parameters are a variant of this idea: they allow you to modify an object by changing specific old attribute values to new values. E.g., you can use the REMAP_SCHEMA parameter to change occurrences of schema name SCOTT in a document to schema name BLAKE.

It is often desirable to access specific attributes of an object's metadata, e.g., its name or schema. You could get this information by parsing the returned metadata, but the API provides another mechanism: you can specify parse items, specific attributes that will be parsed out of the metadata and returned in a separate data structure.

The Metadata API provides two styles of retrieval interface, one for programmatic use, the other for ad hoc browsing.

Heterogeneous Object Types

Some users of the Metadata API need to fetch collections of objects which, although they are of different object types, nevertheless comprise a logical unit, e.g., all the objects in a database, or all objects in a schema, or a table and all its dependent indexes, constraints, grants, audits, etc. To meet this need the API provides, in addition to the homogeneous object types discussed so far, a number of heterogeneous object types. A heterogeneous object type is an ordered set of object types. Heterogeneous object types have various uses including implementing collections of objects corresponding to the Data Pump Export modes (full database, schema, user, tablespace)

implementing object types that are themselves object collections (e.g., DOMAIN_INDEX).

The member types of a heterogeneous object type may be homogeneous or heterogeneous; the result is a tree of object types. Each node in the tree has one or more path names. A node's path name is the node's name, optionally prefixed by the names of its ancestors, separated by slashes. For example, consider the following heterogeneous object type:

```
EXAMPLE
    TABLE
        TABLE
        OBJECT_GRANT
    VIEW
        VIEW
        OBJECT_GRANT
```

The top-level type 'EXAMPLE' contains two member heterogeneous object types named 'TABLE' and 'VIEW'. The heterogeneous type 'TABLE' contains two homogeneous types 'TABLE' and 'OBJECT_GRANT'. The path names for this last object are 'OBJECT_GRANT', 'TABLE/OBJECT_GRANT' and 'EXAMPLE/TABLE/OBJECT_GRANT'. Note that the partial path name 'OBJECT_GRANT' denotes two nodes (grants on tables and grants on views). Only the full path name is guaranteed to uniquely identify a single node. The API interprets a path name as meaning the named node (or nodes) and all of its (their) descendants. Thus, 'EXAMPLE/TABLE' denotes the entire heterogeneous 'TABLE' object type (both tables and grants on tables).

Heterogeneous object types can take filters. A filter on the type is translated into filters on the member types. In the example above, a NAME filter on the TABLE heterogeneous object type translates to (a) a NAME filter on the homogeneous TABLE member type and (b) a BASE_OBJECT_NAME filter on the OBJECT_GRANT member type. The result is what you would expect: the API fetches the named table and its grants.

The Submit Interface

The API provides both a retrieval and a submit interface. You use the submit interface to recreate an object extracted by the retrieval interface. When multiple objects are recreated, however, the order in which they are created is constrained. E.g., a schema (user) must be created before its objects. The order is only a partial order; some objects need not follow any particular creation order. E.g., one schema and its objects may be created before, after or concurrently with another schema and its objects so long as there are no cross-schema dependencies. Thus for a given collection of objects there may be many valid creation orders (and many invalid ones). In general, the Metadata API returns objects belonging to a heterogeneous object type in a valid creation order.

Problems with the Metadata API

The Metadata API as disclosed in U.S. Pat. No. 6,708,186 and U.S. Ser. No. 10/014,038 produced full XML (the XML produced by GET_XML, etc.). Full XML is a collection of data values in the same format as they appear in the Oracle dictionary in a particular Oracle RDBMS, e.g., bit-encoded columns like "property" and "flags" are fetched "as is" rather than being exploded into separate elements. The fact that full XML uses the format in which data values appear in the same format as they do in the Oracle dictionary in a particular Oracle RDBMS causes a number of problems:

Full XML is far more difficult for a human reader to understand than the DDL statements which created the objects described in the metadata.

Full XML contains many elements of the metadata that cannot be specified by the user.

Much of the information in full XML is dependent on the manner in which the database is implemented in a particular database system; consequently, a full XML representation of metadata from one system cannot be compared with a full XML representation of metadata from another system, even though the metadata from the systems is logically equivalent.

The fact that the full XML representation of metadata from a particular system is peculiar to that system means that full XML from two different Oracle RDBMS systems cannot be automatically compared to determine the differences between the metadata in the systems, and that means in turn that the differences between the full XML from the systems cannot be used to automatically alter the metadata in one of the systems so that it is identical to the metadata in the other of the systems. It is an object of the invention disclosed herein to overcome these problems with full XML by providing a representation of a relational database management system's metadata that is easily read by humans, contains only user-specifiable elements of the metadata, and is comparable from one relational database management system to another.

SUMMARY OF THE INVENTION

The foregoing object of the invention is attained by representations of the metadata of objects in a database system that are automatically produced by the database system from the metadata. The objects in the database system belong to classes and the representations are characterized in that representations of the metadata for objects belonging to the same class are automatically comparable by the database system to determine differences between the metadata for the objects.

The representations have additional characteristics including

- a given property specified by the metadata for an object belonging to the class is expressed in only one way in the representation;
- the representation do not include properties specified by the metadata for an object belonging to a class that belong only to a particular instance of the object;
- the representations include only those properties specified by the metadata for an object which a user may specify when creating the object;
- the database system is a relational database system that responds to SQL and the representations employ constructs from the BNF syntax for SQL and SQL names for objects in the metadata;
- the database system automatically reads the representations to produce metadata for other objects that are like the objects;
- the database system automatically reads a first representation and a second representation of the metadata for objects belonging to the same class to produce a third representation that shows the differences between the metadata of the objects represented by the first representation and the second representation.

Where the database system in a relational database system that responds to SQL, the database system automatically produces creation DDL from the representations of the metadata for the objects and also automatically compares representations for first ones of the objects with representations for second ones of the objects and produces ALTER DDL which, when applied to the second objects by the database system, makes the second objects like the first objects. The representations are made according to the XML standard.

Other aspects of the invention include apparatus and methods for comparing metadata for a set of at least two objects belonging to the same class of object which use representations having some or all of the properties just set forth.

Further objects and advantages will be apparent to those skilled in the arts to which the invention pertains upon perusal of the following Detailed Description and drawing, wherein:

BRIEF DESCRIPTION OF THE DRAWINGS

FIG. 2A is a first part of a programming example showing how the invention is used;

FIG. 2B is a second part of the programming example of FIG. 2A;

FIG. 2C is a third part of the programming example of FIG. 2A;

FIG. 3 is a table of classes of objects whose definitions may be retrieved using API 120;

FIG. 4A is a first portion of a table of the filters that can be used to specify sets of objects belonging to a class;

FIG. 4B is a second portion of the table of FIG. 4A;

FIG. 5A is a first portion of a table of the filters that can be applied to objects of TABLE class 141;

FIG. 5B is a second portion of the table of FIG. 5A;

FIG. 6 is a table of the items that can be specified in the set_parse_i tern procedure;

FIG. 7A is a first portion of the table of the transform parameters that can be set for the DDL transform;

FIG. 7B is a second portion of the table of FIG. 7A;

FIG. 8 is the definition of user-defined types used in the interfaces of certain of the procedures and functions of API 120;

FIG. 9A is a first part of definitions of tables belonging to aggregation metadata 109;

FIG. 9B is a second part of the definitions of FIG. 9A

FIG. 10A is a first part of a definition of a UDT 110 used to aggregate metadata about objects of the TABLE class;

FIG. 10B is a second part of the definition of FIG. 10A;

FIG. 11 is a definition of a view 111 used with the UDT of FIG. 10;

FIG. 12 is the creation DDL for an example TABLE object, SCOTT. BONUS;

FIG. 13A is a first part of the XML representation of object 121 for the table SCOTT. BONUS;

FIG. 13B is a second part of the XML representation of FIG. 13A;

FIG. 14 is a portion of the XSL style sheet used to transform the XML representation into the creation DDL;

FIG. 16 shows a table CONSTR_TAB that will be used as an example in the discussion of SXML;

FIGS. 17A and B show a portion of the full XML for CONSTR_TAB;

FIGS. 18A-C show the entire SXML for CONSTR_TAB;

FIGS. 19A-C show portions of the XSL-T template used to translate a full XML document representing a table object's metadata into an SXML document representing the table object's metadata;

FIG. 20 shows a first SXML document representing the metadata for a first version of a table EMP;

FIG. 21 shows a second SXML document representing the metadata for a second version of a table EMP;

FIG. 22 shows a third SXML document that shows the difference between the metadata for the first and second versions of the tables;

FIG. 24 shows tables of parameters.

Figure 1:
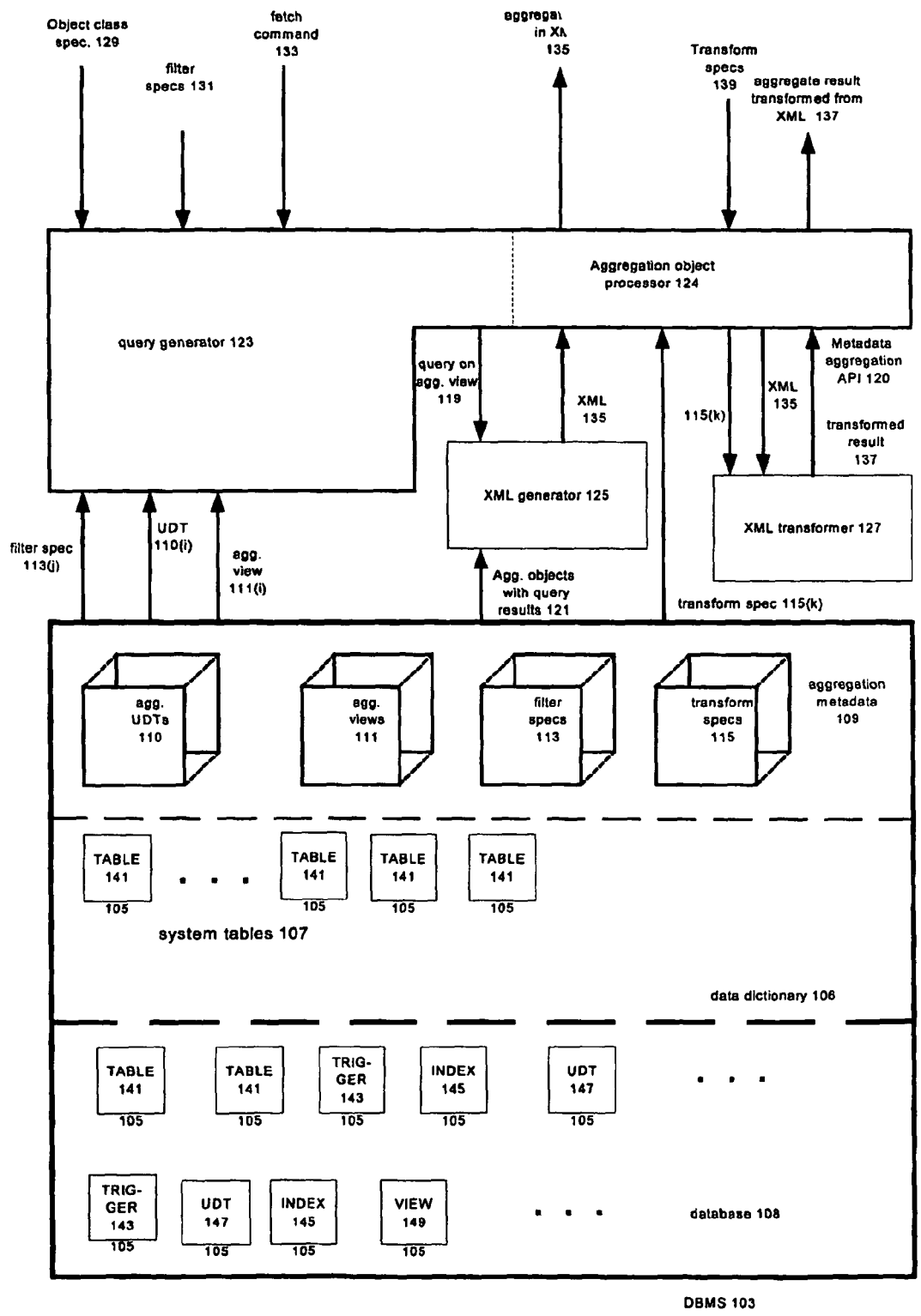
FIG. 1 is a block diagram of a database system in which the invention is implemented.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The Detailed Description will first present a description of the system in which the invention is implemented from U.S. Pat. No. 6,708,186 and will then present a description of the invention and its implementation in the system of U.S. Pat. No. 6,708,186. The description of the invention begins with the section, Abstract XML.

Overview of the System in which the Invention is Implemented: FIG. 1

FIG. 1 shows a system 101 in which the invention is implemented. system 101 is part of the Oracle9i Server, manufactured by Oracle Corporation. As explained in the Description of related art, DBMS 103 is an object relational database.

Data is stored in objects 105. The objects in data dictionary 106 contain metadata which describes all of the objects in DBMS 103.

Added to DBMS 103 is aggregation metadata 109 in data dictionary 106 and metadata aggregation application program interface (API) 120, which contains code that uses information in aggregation metadata 109 to obtain metadata 121 about objects 105 from data dictionary 106, uses XML generator 125 to make an XML representation 135 of the information, and uses XML transformer 127 to transform XML representation 135 to obtain a desired output 137 such as a DDL description of one or more objects 105. In the preferred embodiment, XML generator 125 and XML tranformer 127 are generally-accessible components of DBMS 103. XML generator 125 receives a query, executes it, and transforms the result into an XML document. XML transformer 127 receives an XML document and a transform specifier and transforms the XML as specified by the transform specifier. XML (Extensible Markup Language) is a standard language for defining application/industry-specific tagged dialects for description of the definer's unique data. XML is particularly useful for this purpose because it separates the description of the dialect from the content of the data for which the dialect is to be used. The separation of description and content permits easy parsing and transformation of XML documents using industry standard tools. For more information about XML, see http://www.w3.org/XML. In other embodiments, other intermediate representations may be employed. XML documents may be transformed by means of style sheets written in XSL. In its most general form, XSL is a way to transform an XML document into something else based on a set of rules embodied in the stylesheet. The output is another XML document, or HTML, or SQL text, or whatever else may be specified by the stylesheet. Recently, it has been recognized that the data transformation aspects of XSL are so powerful that they have been separated from the presentation rules and renamed XSL-T. For details, see http://www.w3.org/Style/XSL.

Continuing in more detail, the aggregation metadata 109 include a number of aggregation user-defined types 110. Each aggregation user-defined type 110 corresponds to a class of objects 105. An aggregation UDT 110 defines fields for all of the metadata needed to make a definition of an object belonging to the class to which the UDT 110 corresponds. An object that has an aggregation UDT will be termed hereinafter an aggregation object. Corresponding to each aggregation user-defined type 110, and thus to a class of objects, is an object view 111 which maps the sources in system tables 107 for metadata for objects of the class onto the fields of the aggregation UDT 110 for the class. Such an object view will be termed hereinafter an aggregation object view. Query generator 123 makes a query 119 over aggregation object view 111 for the class that obtains the metadata for a set of objects of the class. The query returns a set 121 of aggregation objects of the class's UDT 110. Each aggregation object returned by the query contains the metadata for one of the objects belonging to the set of objects of the class.

The set 121 of returned aggregation objects goes to XML generator 125 in metadata aggregation API 120, which generates an XML document 135 that contains the metadata from the set of aggregation objects 121. If the XML document needs to be transformed in any way, for example, into a DDL specification that uses the information from an aggregation object, the transformation can be done in XML transformer 127. The client may of course simply take XML output 135 from API 120 and apply its own transforms to the XML output.

The remaining components of aggregation metadata 109 permit refinement of query 119 and specification of the transformations produced by XML transformer 127. Filter specifications 113 are specifications for restricting the set of objects for which the query 119 retrieves the metadata. For example, aggregate view 111 might be for the class of TABLE objects; a filter specification 113 can be used to limit the information retrieved by query 119 to the metadata for the set of TABLE objects whose names include the word PAYROLL. When a filter is specified in API 120, query generator 123 adds a WHERE clause to query 119 which specifies that the returned result will be limited to a subset of the rows in aggregation view 111 that have the property specified in the filter. Transform specifications 115 are specifications that describe transformations made by XML transformer 127 on the XML produced from the set 121 of aggregation objects; one such transformation is the transformation from XML to DDL.

In the preferred embodiment, a client which is using API 120 does so by first specifying the class of objects for which descriptions are to be obtained (129), then specifying one or more filters for the query 119 (131), then specifying one or more transformation specifications (139) indicating how the XML produced from the set 121 of aggregation objects returned by the query is to be transformed (139). When all of this has been specified, the client issues a fetch command 133, which causes query generator 123 to make a query 119 on the aggregation object view 111 for the class that has been restricted as specified by the filters 113 and provide query 119 to XML generator 125, which executes the query and generates XML document 135 from the set of returned objects 121 (135). If any transform specifications 115 were specified, aggregation object processor 124 causes XML transformer 127 to transform XML document 135 as specified in the transforms specifications 115 to produce transformed result 137 and then outputs transformed result 137.

It should be pointed out here that the techniques used in system 101 to map information in objects 107 to fields in an aggregation object and to generate XML from the information in the aggregation object can be used to produce metadata in any form which may be useful to a client, and can thus be used to produce metadata according to a number of different models. Thus, though the metadata produced in the preferred embodiment conforms to the Oracle metadata model, system 101 can also produce metadata that conforms to the ANSI-1999 SQL model. All that is required to fetch the metadata for a class of objects 105 according to a given model is making a UDT 110 and object view 111 for the class and model. In the preferred embodiment, the class and model constitute a name for the information aggregated by the UDT 110 and object view 111 and API 120 associates UDT 110 and object view 111 with the name. If there is a standard form in which the model is expressed, a transform specification 115 can be added which produces that form from the XML generated from the set 121 of aggregation objects returned by the query. In some cases, model differences may even be dealt with by simply transforming the XML as required for the model in question.

It should further be pointed out that the techniques used in system 101 are not limited to retrieving and transforming metadata, but can be employed in any situation where information needs to be aggregated from a number of different objects in database 108. One way of doing this is simply to define a name for a new class of information in API 120, define a UDT that contains an instance of the aggregated information, define an object view whose rows are objects of the UDT, and associate at least the UDT and object view with the name for the new class of information. When that is done, API 120 can be used to aggregate the new information.

Another way of doing it is to make a new API that works on the same principles as API 120. If the new API is only going to aggregate one kind of information, it need not even name the aggregated information, since the UDT and object view can be simply associated with the new API. As in API 120, filters may be defined and associated with the API, an intermediate form such as XML may be generated from the aggregated information in the objects of the UDT, and the intermediate form may be transformed as specified in transform specifications. If the API is to retrieve a number of different kinds of information, the kinds of information to be retrieved may be given names, the UDT, object view, and filters for a given kind of information may be associated with the name for the given kind of information, and the name may be used in the API in the same fashion as the name for a class of objects is used in API 120.

One example of a system like system 101 that is used to aggregate information other than metadata is a system that aggregates the information from the database that is needed to generate a purchase order. As is the case with metadata, the information needed for a purchase order tends to be contained in a wide variety of objects. In such a system, the XML document containing the aggregated information would be transformed as required to produce a purchase order.

Details of a Preferred Embodiment

In the following, there will first be presented an overview of the programming interface to system 101 and an example program for obtaining descriptions of metadata, then a detailed description of the programming interface, and finally examples of an aggregation UDT 110, an aggregation view 111 using the example UDT, the XML output produced from the aggregation object 121 returned by the query, and the DDL produced from the XML.

The Programming Interface to System 101

From a programmer's point of view, system 101 has an open-fetch-close programming paradigm. A program executed by a client will generally use the procedures and functions provided by API 120 as follows:

1. A call to 'OPEN' is made describing the class of object 105 for which metadata is being requested (tables, indexes, etc). A handle is then returned to be used in all subsequent operations for the set of objects for which metadata is being requested.
2. 'SET_FILTER' is then called (perhaps multiple times) to further refine and restrict the set of objects to be fetched. This establishes the WHERE clause predicates on the query that will be executed against the appropriate aggregation view(s) 111. A large variety of filter criteria are available for each class of object; common ones are object name and schema expression matching. For tables, special filter criteria are available to specify heap storage only (no IOTs), non-partitioned, relational only (no object tables), etc. If specified, these allow query generator 123 to prune the set of object views to be queried for higher performance.
3. 'ADD_TRANSFORM' may optionally be called (perhaps multiple times) to specify various transformations that are to be executed on the resultant XML documents. The transformations are specified by means of XSL-T stylesheets. The caller may specify the URL of its own private stylesheet; for example, to remove or add a column to a table's metadata. Or, the caller may specify 'DDL' which tells API 120 to generate creation DDL for the object using its own stylesheets. In either case, a transform handle is returned. This handle is different from the handle returned by OPEN. It is used to further refine the transform as described in the next step.
4. 'SET_TRANSFORM_PARAM' may then be called (perhaps multiple times) using the transform handle from the previous step. This allows the caller to pass transform-dependent runtime values to the XSL-T stylesheet. Some of the various transform options that can be specified are: 'Don't include constraints', 'Don't include storage or tablespace clauses', 'Pretty print the output', 'Do/don't include the SQL terminator character (;)', 'Do/don't include package or type bodies with their specifications'.
5. Once the preliminary setup is complete, the calling program will loop, calling one of the various 'fetch' functions to retrieve and output the metadata for objects matching the selection criteria. The metadata will be output either as an XML document or as creation DDL.
6. The fetch functions return NULL when there is no more metadata for database objects that match the selection criteria specified in the open and filter routines. The CLOSE function should then be called with the handle from step 1. API 120 will then clean up any currently allocated resources.

An Example Program using the Metadata Aggregation API: FIGS. 2A-2C

FIGS. 2A-2C show a procedure get_payroll_tables 201 that is written in the PL/SQL language. get_payroll_tables 201 retrieves table definitions for a user of the database system. The table definitions belong to a schema associated with the user, that is, a collection of objects 105 associated with the user. In this case, the schema belongs to a user of DBMS 103 for which a client is executing the procedure. The procedure returns the metadata for all objects in the client's schema that have the class TABLE and whose names begin with PAYROLL and the metadata for each table's indexes.

Beginning with FIG. 2A, at 203 are shown declarations for variables representing handles for collections of data produced or used by API 120. tableOpenHandle is the handle for the table metadata that will be returned by the procedure; indexOpenHandle is the handle for the index metadata that will be returned by the procedure; tableTransHandle is the handle for the transforms that will be used on the XML generated from the table metadata returned by the procedure; and indexTransHandle is the handle for the transforms that will be used on the XML generated from the index metadata returned by the procedure. In both cases, the transform will make DDL from the XML. At 205 are shown declarations for character strings for storing schema and table names returned by the procedure. At 207 are shown declarations for objects that will be used to hold the DDL and the list of indexes produced by the procedure; at 209, finally, there is a declaration for a character large object (CLOB) which will hold the DDL for the indexes.

Continuing with the code, at 211, the output file which will contain the DDL for the tables and indexes whose metadata are returned by the procedure is opened. At 213, the open procedure of API 120 is used to begin setting up API 120. The 'TABLE' argument used with open indicates that the API 120 will be returning metadata for objects of the TABLE class. open returns a handle, which is assigned to tableOpenHandle. At 215, the first of the filters is specified. The API's set_count procedure specifies how the metadata for the table objects is to be returned. In this case, it specifies that the metadata will be returned one object at a time. At 217, the API's set_filter procedure specifies that metadata for a table will be returned only if the table's name starts with the string PAYROLL.

Further filters at 219 and 221 specify that each retrieved table's schema and name will be parsed out separately so that they can be used with API 120 to retrieve the indexes of the tables. Note that with all of these procedures, the handle value in tableOpenHandle is used to identify the context in which the filter is to operate.

Next, the code specifies the transforms. At 223, the main transform is specified, namely that the result is to be transformed into DDL for the tables. Function add_transform 223 is invoked with the open handle value and a specification, 'DDL', of the transform, and returns a handle for the transform, which is assigned to tableTransHandle. The transform handle is then used to further define the transform at 225. Two invocations of API 120's set_transform_param procedure specify that no physical storage information is to be included in the DDL and that there will be an SQL terminator on the DDL for each table. At this point, the set up is completed and the information about the tables may be fetched. The information will be fetched using a query 119 that is made using the object specification from open and the filters specified by set_count, set_filter, and set_parse_item. As the information is fetched, XML will be generated from it and will then be transformed into DDL as specified by add_transform and set_transform_param.

The fetching and processing of the results is done in FIGS. 2B and 2C. Beginning with FIG. 2B, a loop 227 (continued in FIG. 2C) repeatedly executes the API 120 function fetch_ddl 229. Each time the function is executed, it retrieves the metadata for a table that belongs to the schema of the user for whom the client is executing the get_payroll_tables procedure and that conforms to the restrictions specified in the filters, parses out the table's schema name and table name from the metadata, and transforms the XML generated from the metadata into DDL as specified by the transforms. As shown at 231, the loop terminates when there is no more metadata to be fetched for tables that match the search criteria. Other fetch functions will return the XML for the metadata itself or a CLOB that contains either XML or DDL, depending on the transforms applied to the XML.

As each instance of table metadata is fetched, XML is generated from it, and the XML is transformed into DDL. Additionally, the metadata is parsed to obtain the table's name and schema name. The DDL made from the metadata is assigned to the variable tableDDLs, which is a collection whose elements are DDL statements and a nested table of any parse items specified using set_parse. In the present case, the collection will always have only 1 element. At 233, this element is assigned to tableDDL. Next, tableDDL.ddltext, which contains the DDL made from the XML resulting from the execution of fetch is output to the output file. Then tableDDL.parsedItems, which contains the parsed out schema and table names is assigned to a vector of parsed items. Here, the vector will always only have two elements, one for the table name and one for the schema name. Since there is no guarantee of the order in which the table name and schema name will appear in the vector, the code at 235 checks and depending on what it finds, assigns the name to schemaName or tableName.

FIG. 2C shows the portion of get_payroll_tables which gets and processes the indexes of the table which has just been retrieved at 229. At 239, API 120's open function is used as before, but this time, it specifies that the metadata being retrieved is that for objects of the INDEX class. The returned value is a handle for the index processing context. Next, set_filter is used at 241 and 243 to specify that the index information be returned for the table belonging to the schema (specified by schemaName) and having the table name (specified by tableName) returned for the table retrieved at 229. Then at 245-247, the transforms are specified. The XML for the indexes for the table is to be transformed into DDL, again without data storage information and with SQL terminators. Finally, at 251, a loop is executed which uses the fetch_clob variant of API 120's fetch function to fetch and transform each index value for the table and output the transformed index value to the output file. The loop terminates when there are no more index values for the table. Thus, in the output file, the DDL for each fetched table will be followed by the DDL for its indexes. The close procedure at 253 frees the resources used by API 120 and after that, the output file is closed.

As can be seen from the get_payroll_tables procedure, a client of a DBMS 103 that has metadata aggregation API 120 can obtain the creation DDL for a set of objects 105 belonging to a given class without having any knowledge whatever of the details of the actual arrangements for specifying the metadata for the objects in system tables 107. Moreover, the filters permit the client to specify exactly the objects for which metadata will be retrieved. The transforms, finally, permit the client to closely define the DDL output. The API permits specification of multiple filters and transforms, with the output of one transform serving as the input to the next. Additionally, since API 120 actually produces an XML representation of the metadata and produces the DDL output by applying an XSL-T style sheet to the XML representation, other transforms can be easily added to API 120 and the client can also take the XML representation and apply its own XSL-T style sheets to it. Finally, API 120 can easily be extended to handle different models of metadata by adding new aggregation UDT's 110 and aggregation object views 111, together with whatever new filter specifications 113 are required for queries over the new object views, and transform specifications 115 can be added as needed to deal with the XML produced from objects having the type of the new aggregation UDT.

Details of a Preferred Embodiment of Metadata Aggregation API 120: FIGS. 3-8

The following discussion will first provide a detailed specification of the interfaces for the procedures and functions employed in a preferred embodiment of API 120 and of the operations which they perform and will thereupon give details of aggregation metadata 109 in a preferred embodiment and of XML and creation DDL produced using API 120.

```
DBMS_METADATA.OPEN( )
FUNCTION open
        (   object_type         IN VARCHAR2,
            version             IN  VARCHAR2  DEFAULT
                                    'COMPATIBLE',
            model               IN  VARCHAR2  DEFAULT
                                    'ORACLE'
        ) RETURN NUMBER;
```

OPEN specifies the class of object for which metadata is to be retrieved, the version of its metadata, and the model for the metadata. The return value is an opaque context handle for the set of objects that will be returned with the metadata.

Parameters object_type—the class of object for which metadata to be retrieved. FIG. 3 lists the currently-valid class names and their meanings. Most objects have names, belong to schemas, and are uniquely identified within their namespace by their schema and name. Some objects may not be schema objects, for example objects that represent users; other objects may not have names. These differences are relevant when choosing object selection criteria. See SET_FILTER, below. As is apparent from the foregoing discussions, system 101 may be extended to retrieve metadata for any class of objects used presently or in the future in DBMS 103.

version—the version of metadata to be extracted. Database objects or attributes that are incompatible with the version will not be extracted. Legal values for this parameter are 'COMPATIBLE'—(default) the version of the metadata corresponds to the database compatibility level and the compatibility release level for feature.

'LATEST'—the version of the metadata corresponds to the version of DBMS 103.

A specific database version.

model—The API can support views corresponding to different metadata models such as Oracle proprietary, ANSI99, Common Warehouse Metadata (CWM). model specifies which aggregation UDTs 110 and aggregation object views 111 will be used by fetch. The object and model parameters together are thus the name with which the aggregation UDTs and aggregation object views are associated in the preferred embodiment.

Returns an opaque handle to the class of objects. This handle is used as input to the API functions and procedures SET_FILTER, SET_COUNT, ADD_TRANSFORM, GET_QUERY, SET_PARSE_ITEM, FETCH_xxx and CLOSE.

Exceptions

| Exception | Description |
|---|---|
| INVALID_ARGVAL | A NULL or invalid value was supplied for an input parameter. The error message text identifies the parameter. |
| INVALID_OBJECT_PARAM | The version or model parameter was not valid for the object_type. |

```
DBMS_METADATA.SET_FILTER( )
PROCEDURE set_filter
            (  handle   IN NUMBER,
               name     IN VARCHAR2,
               value    IN VARCHAR2);
PROCEDURE set_filter
            (  handle   IN NUMBER,
               name     IN VARCHAR2,
               value    IN BOOLEAN DEFAULT
                        TRUE);
```

SET_FILTER specifies restrictions on the objects to be retrieved, e.g., the object name or schema. There are two versions of the procedure, one that uses a filter with a Boolean value and another that uses a filter with a character string value.

Parameters handle—the handle returned from OPEN.

name—the name of the filter. FIG. 4 is a table 401 that lists for each filter the class of objects the filter applies to, the filter's datatype (text or boolean) and its meaning or effect (including its default value, if any). FIG. 5 is a table 501 that lists the filters for the table class.

value—the value of the filter.

Exceptions

| Exception | Description |
|---|---|
| INVALID_ARGVAL | A NULL or invalid value was supplied for an input parameter. The error message text identifies the parameter. |
| INVALID_OPERATION | The user called SET_FILTER after the first call to FETCH_xxx for the OPEN context. Once the first call to FETCH_xxx has been made, no further calls to SET_FILTER are permitted. |
| INCONSISTENT_ARGS | The filter name is not valid for the object type associated with the OPEN context, or the filter value is the wrong datatype. |

Security

SET_FILTER allows the caller to specify the schema of objects to be retrieved, but security considerations may override this specification. If the caller has the necessary privileges, then any object may be retrieved; otherwise, only (a) schema objects owned by the caller or (b) privileges granted to or by the caller may be retrieved. If callers request objects they are not privileged to retrieve, no exception is raised; the object is simply not retrieved, just as if it did not exist.

```
DBMS_METADATA.SET_COUNT( )
PROCEDURE set_count
            (  handle   IN NUMBER,
               value    IN NUMBER);
```

SET_COUNT specifies the number of objects to be retrieved in a single FETCH_xxx call. By default, each call to FETCH_xxx returns one object. SET_COUNT allows one to override this default. If FETCH_xxx is called from a client, specifying a count value greater than one can result in fewer server round trips and, therefore, improved performance.

Parameters handle—the handle returned from OPEN.

value—the number of objects to retrieve.

Exceptions

| Exception | Description |
|---|---|
| INVALID_ARGVAL | A NULL or invalid value was supplied for an input parameter. The error message text identifies the parameter. |
| INVALID_OPERATION | The user called SET_COUNT after the first call to FETCH_xxx for the OPEN context. Once the first call to FETCH_xxx has been made, no further calls to SET_COUNT are permitted. |

```
DBMS_METADATA.GET_QUERY( )
FUNCTION get_query
            (  handle   IN NUMBER)
               RETURN VARCHAR2;
```

GET_QUERY returns the text of the query (or queries) that will be used by FETCH_xxx. This function is provided to assist in debugging.

Parameters handle—the handle returned from OPEN.

Returns the text of the query (or queries) that will be used by FETCH_xxx.

Exceptions

| Exception | Description |
| --- | --- |
| INVALID_ARGVAL | A NULL or invalid value was supplied for the handle parameter. |

DBMS_METADATA.SET_PARSE_ITEM( )

```
PROCEDURE set_parse_item
            (     handle     IN NUMBER,
                  name       IN VARCHAR2);
```

SET_PARSE_ITEM (1) enables output parsing and (2) specifies an object attribute to be parsed and returned.

Parameters handle—the handle returned from OPEN.

name—the name of the object attribute to be parsed and returned. Table 601 in FIG. 6 lists for each valid attribute its name, the object class it applies to, and its meaning.

Exceptions

| Exception | Description |
| --- | --- |
| INVALID_ARGVAL | A NULL or invalid value was supplied for an input parameter. The error message text identifies the parameter. |
| INVALID_OPERATION | The user called SET_PARSE_ITEM after the first call to FETCH_xxx for the OPEN context. Once the first call to FETCH_xxx has been made, no further calls to SET_PARSE_ITEM are permitted. |
| INCONSISTENT_ARGS | The attribute name is not valid for the object type associated with the OPEN context. |

Usage

By default fetch_xml and fetch_ddl simply return an object's metadata as XML or creation DDL. By calling SET_PARSE_ITEM one can request that metadata describing individual attributes of the object be returned as well. This is useful when fetching objects based on the value of a returned object, e.g., fetching indexes for a returned table.

One can call SET_PARSE_ITEM multiple times to ask for multiple items to be parsed and returned. Parsed items are returned in the sys.ku$_parsed_items nested table. For a fuller discussion of this topic see FETCH_xxx, "Usage," below.

DBMS_METADATA.ADD_TRANSFORM( )

```
FUNCTION add_transform
            (     handle     IN NUMBER,
                  name       IN VARCHAR2)
            RETURN NUMBER;
```

ADD_TRANSFORM specifies a transform that FETCH_xxx applies to the XML representation of the retrieved objects. It is possible to add more than one transform. See "Usage," below.

Parameters handle—the handle returned from OPEN.

name—the name of the transform. If name is "DDL" creation DDL will be generated using XSL-T scripts provided in transform specs 115. If name contains a period (.), colon (:) or forward slash (/), it is interpreted as the URL of a user-supplied XSL-T script.

Returns an opaque handle to the transform. This handle is used as input to SET_TRANSFORM_PARAM. Note that this handle is different from the handle returned by OPEN; it refers to the transform, not the set of objects to be retrieved.

Exceptions

| Exception | Description |
| --- | --- |
| INVALID_ARGVAL | A NULL or invalid value was supplied for an input parameter. The error message text identifies the parameter. |
| INVALID_OPERATION | The user called ADD_TRANSFORM after the first call to FETCH_xxx for the OPEN context. Once the first call to FETCH_xxx has been made, no further calls to ADD_TRANSFORM are permitted. |

Usage

By default (i.e., with no transforms added) objects are returned as XML documents. One can call ADD_TRANSFORM to specify an XSL-T script to transform the returned documents.

One can call ADD_TRANSFORM more than once to specify that multiple transforms are to be applied to the returned XML documents. FETCH_xxx will apply the transforms in the order in which they were specified, the output of the first transform being used as input to the second and so on. Note that the output of the "DDL" transform is not an XML document and that consequently no further transforms of it are possible.

```
DBMS_METADATA.SET_TRANSFORM_PARAM( )
PROCEDURE set_transform_param
            (     transform_handle     IN NUMBER,
                  name                 IN VARCHAR2,
                  value                IN VARCHAR2);
PROCEDURE set_transform_param
            (     transform_handle     IN NUMBER,
                  name                 IN VARCHAR2,
                  value                IN BOOLEAN DEFAULT
                                          TRUE);
```

SET_TRANSFORM_PARAM specifies parameters to the XSL-T stylesheet identified by transform_handle. There are two versions of the procedure: one for transform parameters having character values and one for transform parameters having Boolean values.

Parameters transform_handle—either (1) the handle returned from ADD_TRANSFORM, or (2) the enumerated constant SESSION_TRANSFORM which designates the "DDL" transform for the whole session. See "Usage," below. Note that the handle returned by OPEN is not a valid transform handle.

name—the name of the parameter. Table 701 in FIG. 7 lists the transform parameters defined for the "DDL" transform. For each transform parameter, the table specifies specifying the class of objects the parameter applies to, the parameter's datatype (always Boolean in table 701), and its meaning or effect (including its default value, if any).

value—the value of the transform.

Exceptions

| Exception | Description |
| --- | --- |
| INVALID_ARGVAL | A NULL or invalid value was supplied for an input parameter. The error message text identifies the parameter. |
| INVALID_OPERATION | The user called SET_TRANSFORM_PARAM after the first call to FETCH_xxx for the OPEN context. Once the first call to FETCH_xxx has been made, no further calls to SET_TRANSFORM_PARAM are permitted. |
| INCONSISTENT_ARGS | The transform parameter name is not valid for the object type associated with the OPEN context. |

Usage

XSL-T stylesheets may have parameters that are passed to them at runtime. SET_TRANSFORM_PARAM is used in API 120 to specify the value of a parameter of the stylesheet identified by transform_handle. The most general way to specify stylesheet parameter values is as text strings, but for the "DDL" transform it is convenient to use Boolean values to set parameters. Consequently, two variants of the procedure are provided.

DBMS_METADATA.FETCH_xxxo

A preferred embodiment includes the following versions of the FETCH functions and procedures:

| | |
| --- | --- |
| FUNCTION fetch_xml ( | handle IN NUMBER) RETURN XMLType; |
| FUNCTION fetch_ddl ( | handle IN NUMBER) RETURN sys.ku$_ddls; |

See 807 and 809 in FIG. 8 for the specification of sys.ku$_ddls.

| | |
| --- | --- |
| FUNCTION fetch_clob ( | handle IN NUMBER) RETURN CLOB; |
| PROCEDURE fetch_clob ( | handle IN NUMBER, xmldoc IN OUT NOCOPY CLOB); |

FETCH_xxx returns metadata for objects meeting the criteria established by OPEN, SET_FILTER, etc. Other embodiments may also include the following variant:

| | |
| --- | --- |
| FUNCTION fetch_xml ( | handle IN NUMBER, parsed_items OUT sys.ku$_parsed_items) RETURN XMLType; |

See 803 and 805 in FIG. 8, for the specification of sys.ku$_parsed_items.

The different variants are discussed in "Usage," below.

Parameters handle—the handle returned from OPEN.

xmldoc (procedure fetch_clob)—the document that contains the metadata for the object(s) or NULL if all objects have been returned. The form of the metadata in the document depends on the transforms applied to the XML.

parsed_items (fetch_xml)—a nested table containing the items specified by SET_PARSED_ITEM. NULL is returned if (1) SET_PARSED_ITEM was not called or (2) more than one object is being returned (i.e., SET_COUNT was called specifying a count greater than 1).

Returns the metadata for the object(s) or NULL if all objects have been returned.

Exceptions

Most exceptions raised during execution of the query will be propagated to the caller. Also, the following exceptions may be raised.

| Exception | Description |
| --- | --- |
| INVALID_ARGVAL | A NULL or invalid value was supplied for an input parameter. The error message text identifies the parameter. |
| INCONSISTENT_OPERATION | Either (1) FETCH_XML was called when the "DDL" transform had been specified, or (2) FETCH_DDL was called when the "DDL" transform had not been specified. |

Usage

These functions and procedures return metadata for objects meeting the criteria established by the call to OPEN that returned the handle and the subsequent calls to SET_FILTER, SET_COUNT, ADD_TRANSFORM, etc. Each call to FETCH_xxx returns metadata for the number of objects specified by SET_COUNT (or less, if fewer objects remain) until all metadata for the set of objects specified by SET_FILTER has been returned. After metadata for the last object in the set is returned, subsequent calls to FETCH_xxx return NULL and cause the stream created by OPEN to be transparently closed.

There are several different FETCH_xxx functions and procedures:

FETCH_XML returns the XML metadata for an object as an XMLType. It assumes that if any transform has been specified, that transform will produce an XML document. In particular, it assumes that the "DDL" transform has not been specified. FETCH_XML is overloaded: one variant simply returns the object metadata in XML; the other also returns a nested table of parsed items as an OUT parameter.

FETCH_DDL returns the creation DDL in a sys.ku$_ddls nested table; it assumes that the "DDL" transform has been specified. Each row of the sys.ku$_ddls nested table contains a single DDL statement in the ddlText column; if requested, parsed items for the DDL statement will be returned in the parsedItems column. Multiple DDL statements can be returned (1) when the user called SET_COUNT to specify a count greater than 1 or (2) when the XML for the metadata is transformed into multiple DDL statements (e.g., Metadata for a TYPE object can be transformed into both CREATE TYPE and CREATE TYPE BODY statements. Metadata for a TABLE object can be transformed into a CREATE TABLE and one or more ALTER TABLE statements.)

FETCH_CLOB simply returns the object, transformed or not, as a CLOB.

If SET_PARSE_ITEM was called, FETCH_XML and FETCH_DDL return attributes of the object's metadata (or the DDL statement) in a sys.ku$_parsed_items nested table. For FETCH_XML the nested table is an optional OUT parameter; for FETCH_DDL it is a column in the returned sys.ku$_ddls nested table. Each row of the sys.ku$_parsed_items nested table corresponds to an item specified by SET_PARSE_ITEM and contains the following columns:

item—the name of the attribute as specified in the name parameter to SET_PARSE_ITEM.

value—the attribute's value, or NULL if the attribute is not present in the object or DDL statement.

parent—for future use.

The order of the rows is undetermined; to find a particular item the caller must search the table for a match on item.

If SET_PARSE_ITEM was not called (or if FETCH_XML is returning multiple objects), NULL is returned as the value of the sys.ku$_parsed_items nested table.

FETCH_CLOB comes in both function and procedure variants. The procedure variant returns the object by reference in an IN OUT NOCOPY parameter. This is currently faster than the function variants where LOBs are returned by value, a practice that involves an expensive LOB copy. In other embodiments, functions may return LOBs by reference, rendering the procedure variant unnecessary.

All LOBs returned by FETCH_xxx are temporary LOBs with CALL duration. If FETCH_xxx is invoked by a client program via the Oracle Call Interface (OCI), output LOBs are converted to SESSION duration before being transmitted to the client. It is the client program's responsibility to free the LOB. The same applies to the XMLType object.

In a preferred embodiment, it is expected that the same variant of FETCH_xxx will be called for all objects selected by OPEN, i.e., that clients will not intermix calls to FETCH_XML, FETCH_DDL and FETCH_CLOB using the same OPEN handle. The effect of calling different variants is undefined.

The metadata fetched for each object in a preferred embodiment is internally consistent with respect to on-going DDL (and the subsequent recursive DML) operations against dictionary 106. In some cases multiple queries may be issued for performance reasons (e.g., one query for heap tables, one for index-organized tables, etc.) Consequently the metadata returned by FETCH_xxx calls may in fact include information fetched from different underlying cursors and read consistency therefore cannot be guaranteed.

DBMS_METADATA.CLOSE( )
PROCEDURE close (handle IN NUMBER);
Parameters
handle—the handle returned from OPEN.
Exceptions

| Exception | Description |
| --- | --- |
| INVALID_ARGVAL | The value for the handle parameter is NULL or invalid. |

Usage

This procedure invalidates the handle returned by OPEN and cleans up associated state. The caller may thereby prematurely terminate the stream of objects established by OPEN.

If a call to FETCH_xxx returns NULL indicating that there are no more objects for which metadata will be returned, a call to CLOSE will transparently be made on the caller's behalf. In this case, the caller may still call CLOSE on the handle and not get an exception. (The call to CLOSE is not required but it is safe.)

In the case where the caller knows that only one specific object is to be returned, the caller should explicitly call CLOSE after the single FETCH_xxx call to free up the resources held by the handle.

Simplified Interfaces Provided by API 120

In addition to the procedures and functions just described, API 120 provides two simplified interfaces for use in browsing metadata information for an object and for creating a new object from an XML description of its metadata. The first of these interfaces is the group of functions denominated get_xxx:

```
DBMS_METADATA.GET_xxx( )
FUNCTION get_xml (      object_type    IN VARCHAR2,
                        name           IN VARCHAR2,
                        schema         IN VARCHAR2 DEFAULT NULL,
                        version        IN VARCHAR2 DEFAULT
                                          'COMPATIBLE',
                        model          IN VARCHAR2 DEFAULT
                                          'ORACLE',
                        transform      IN VARCHAR2 DEFAULT NULL)
     RETURN CLOB;
FUNCTION get_ddl (      object_type    IN VARCHAR2,
                        name           IN VARCHAR2,
                        schema         IN VARCHAR2 DEFAULT
                                          NULL,
                        version        IN VARCHAR2 DEFAULT
                                          COMPATIBLE',
                        model          IN VARCHAR2 DEFAULT
                                          'ORACLE',
                        transform      IN VARCHAR2 DEFAULT 'DDL')
     RETURN CLOB;
```

Parameters object_type—the class of object to be retrieved. This parameter takes the same values as the OPEN object_type parameter, above. In addition the following types may be specified:

PACKAGE_SPEC - package specification (without body)
PACKAGE_BODY - package body
TYPE_SPEC - type specification (without body)
TYPE_BODY - type body name—an object name (case-sensitive).

schema—a schema name (case-sensitive). The default is (a) the current schema if object_type refers to a schema object, (b) NULL otherwise.

version—the version of metadata to be extracted. This parameter takes the same values as the OPEN version parameter, above.

model—The metadata model to use. This parameter takes the same values as the OPEN model parameter, above.

transform—the name of a transformation on the output. This parameter takes the same values as the ADD_TRANSFORM name parameter, above. For GET_XML this must not be "DDL."

Returns the metadata for the object as XML or DDL.

Exceptions

| Exception | Description |
| --- | --- |
| INVALID_ARGVAL | A NULL or invalid value was supplied for an input parameter. The error message text identifies the parameter. |
| OBJECT_NOT_FOUND | The specified object was not found in the database. |

Usage

This function provides a simple way to return the metadata for a single object. Conceptually each GET_xxx call comprises an OPEN, one or two SET_FILTER calls, optionally an ADD_TRANSFORM, a FETCH_xxx and a CLOSE. The object_type parameter has the same semantics as in OPEN. schema and name are used for filtering. If a transform is specified, schema-level transform flags are inherited. These functions can't retrieve metadata for objects that do not have unique names. The GET_DDL function defines an enumerated constant SESSION_TRANSFORM as the handle of the "DDL" transform at the session level. The user can call SET_TRANSFORM_PARAM using SESSION_TRANSFORM to set transform parameters for the whole session. GET_DDL inherits these parameters when it invokes the "DDL" transform. Note that in the preferred embodiment, the enumerated constant must be prefixed with the package name for API 120, i.e.,

DBMS_METADATA.SESSION_TRANSFORM

EXAMPLES

Example 1

Fetch the XML representation of the table definition SCOTT.EMP:

```
SELECT DBMS_METADATA.GET_XML('TABLE', 'EMP',
    'SCOTT')
        FROM DUAL;
```

Example 2

Fetch the DDL for all "complete" tables in the current schema, filtering out nested tables and overflow segments. Use SET_TRANSFORM_PARAM (with the handle value=DBMS_METADATA.SESSION_TRANSFORM meaning "for the current session") to specify that storage clauses are not to be returned in the SQL DDL. Afterwards, reset the session-level parameters to their defaults.

```
execute DBMS_METADATA.SET_TRANSFORM_PARAM(
    DBMS_METADATA.SESSION_TRANSFORM,'STORAGE',false);
SELECT DBMS_METADATA.GET_DDL('TABLE',u.table_name)
        FROM USER_ALL_TABLES u
        WHERE u.nested='NO'
        AND (u.iot_type is null or
            u.iot_type='IOT');
execute DBMS_METADATA.SET_TRANSFORM_PARAM(
    DBMS_METADATA.SESSION_TRANSFORM,'DEFAULT');
```

SUBMIT Function

Some embodiments of API 120 may include a SUBMIT function that takes as its input XML that describes the metadata for an object 105 and creates the object from the input XML. In most cases, of course, the input XML is obtained using API 120.

| DBMS_METADATA.SUBMIT( ) |
| --- |
| FUNCTION submit (    document    IN XMLType, <br>                  object_type    IN VARCHAR2, <br>                  operation    IN VARCHAR2, <br>                  model    IN VARCHAR2 DEFAULT ORACLE', <br>                  transform    IN VARCHAR2 DEFAULT 'DDL') <br>                  RETURN sys.ku$_SubmitErrors; |

See 811 and 813 in FIG. 8 for the specification of sys.ku$_SubmitErrors.

Parameters document—the XML document to be submitted.

object-type—the type of object represented by the document. This parameter takes the same values as the OPEN object type parameter, above.

operation—the DDL operation to be performed. Valid values are 'CREATE', 'DROP', 'GRANT' and 'REVOKE'.

model—the metadata view for the document. This parameter takes the same values as the OPEN model parameter, above.

transform—the SUBMIT function converts the XML document to DDL before submitting it to the database. The transform parameter designates the XSL script to perform the transformation. This parameter takes the same values as the ADD_TRANSFORM name parameter, above.

Returns a table of error information if any errors occur, otherwise NULL. Each entry in the table includes the SQL statement that was being processed when the error occurred and the errorNumber and errorString returned by Oracle.

Exceptions

| Exception | Description |
| --- | --- |
| INVALID_ARGVAL | A NULL or invalid value was supplied for an input parameter. The error message text identifies the parameter. |

Usage

This function performs the specified XSL transform to convert the XML document to a CREATE, DROP, GRANT or REVOKE DDL command and then submits the DDL to the database.

Details of Aggregation Metadata: FIGS. 9-15

As described above, API 120 retrieves metadata for objects belonging to particular object classes, with the class of object being specified in the open function called by a client to begin interaction with API 120. Each UDT, object view, and filter spec in aggregation metadata 109 must therefore be associated with an object class. In embodiments in which API 120 retrieves metadata for a variety of different metadata models, objects in aggregation metadata 109 are associated with a model as well as a class. In a preferred embodiment, this is done by means of five tables in aggregation metadata 109. The tables are the following. Their definitions are shown in detail in FIG. 9.

SYS.METAVIEW$ 901: This table is used by API 120 to determine which UDT 110 and view 111 to use for a given client's request. Each row specifies a mapping between a unique object_type 903, model 905, version 906 tuple and a row in SYS.METAVIEW$, and the row specifies a UDT/view combination for the object class, metadata model, and metadata version specified by fields 903, 905, and 906. The API finds the row where object_type/model/version=the client-specified values for those parameters and issues a query against the UDT/view combination identified at 909 and 911. xmltag 907 becomes the tag for the object in the returned XML document. Each model supported by API 120 has its own set of UDTs and object views.

SYS.METAFILTER$ 913: Each row in this table specifies a mapping between a filter name 915 (used in the SET_FILTER name parameter) and the name 919 of its corresponding attribute in a UDT. This allows the caller to use user-friendly names like "NAME" and "SCHEMA" for filtering parameters, and hides the details of how those parameters are encoded in the UDT. At 917, the table row specifies the filter's properties.

SYS.METAXSL$ 921: This table stores URI (universal resource indicator) locators 925 for XSL transformation scripts 115. There is a row in table 921 for each xmltag 907, transform 923, and model 905 tuple. xml tag 907 relates rows in sys.metaxsl$ to classes of objects in data dictionary 106, and there may be multiple transforms associated with a class of objects; e.g, an object of class TABLE object may have XSL scripts for making both creation DDL and "create a snapshot" DDL. transform 923 designates the desired transform, e.g., "DDL." This approach allows the caller of OPEN to use user-friendly names like "DDL" to refer to a class of scripts, i.e., the XSL script (whatever it is and wherever it's located) that convert this object's XML to DDL.

SYS.METAXSLPARAM$ 927: This table stores the legal transform parameters and their default values for transforms defined in SYS.METAXSL$ 921. There is a row for each model 929, transform 931, type (class) 903, param 933 tuple.

SYS.METASTYLESHEET 935: This table stores the actual XSL transformation scripts for transforms defined in SYS.METAXSL$ 921. There is a row for each model 939 and stylesheet name 937 parameter, and the row contains the stylesheet itself at 941.

An Example UDT 110: FIG. 10

FIG. 10 shows an example UDT 1001 for TABLE objects. An object of UDT ku$_table_t 1001 holds the metadata returned by query 119 for an object of class TABLE. XML generator 125 converts the contents of this object into an XML document containing the metadata for the object. As can be seen from FIG. 10, object 121 collects an immense amount of information from data dictionary about the TABLE object. The following fields defined in UDT 1001 are of particular interest to the present discussion:

Fields Defined in FIG. 10A:
- db_version 1002, which contains the version of DBMS 103 that contains the TABLE object;
- version numbers 1003 for user-defined data type 1001; As will be explained in more detail, these are used to make sure that UDT 1001 is compatible with the data base it is being used with;
- obj # 1005, which is the identifier for the TABLE object in the data base system;
- schema_obj 1007, which has the UDT ku$_schemaobj_t. Objects of this class aggregate information common to objects which reside in schemas; the aggregated information includes the object's name, owner, creation date, and object number;
- storage 1009, which has the UDT ku$storage_t. Objects of this class aggregate information about an object's storage; here it is storage for the TABLE object;

Fields Defined in FIG. 10B:
- col_list 1013, a list of the columns defined for the current TABLE object;
- con_list 1015, a list of the constraints defined for the current TABLE object;
- part_obj 1017, a list of the partitions defined for the current TABLE object if the table is partitioned.

Much of this information comes from the table tab$ in system tables 107 in the Oracle 8 server; there is a row in tab$ for each TABLE object in DBMS 103.

The other UDTs that appear in UDT 1001 are the following. Objects with these UDTs receive information from tables in system tables 107; For each of the UDTs, the system table from which objects having the UDT receive information appears in italics. These system tables are the ultimate containers of the information that will be copied into the relevant fields of an object that has UDT 1001 as its type.

ku$_schemaobj_t: UDT for information common to schema-based objects; based on obj$ ku$_storage_t: UDT for storage characteristics of objects; based on seg$ ku$_column_t: UDT for colums; based on col$ ku$_column_list_t: UDT for a list of columns; defined as a nested table of ku$_column_t ku$_constraint_t: UDT for table constraints; based on con$ and cdef$ ku$_constraint_list_t: UDT for a list of columns; defined as a nested table of ku$_constraint_t ku$_part_obj_t: UDT for partitioned objects; based on partobj$ Details of an Aggregation Object View 110 that Retrieves Data for the Fields of an Object having UDT 1001: FIG. 11

FIG. 11 shows the definition of aggregation object view 1101 in a preferred embodiment. Aggregation object view 1101 is an object view which defines a table whose rows are aggregation objects of UDT 1001 for the TABLE class. When a fetch function or procedure runs query 119 as modified by SET_FILTER over aggregation object view 1101, API 120 returns the objects specified by query 119 as specified in the SET_COUNT procedure. Each returned object contains the metadata needed to describe a particular object of the TABLE class. The returned object goes to XML generator 125, which generates XML from it. The XML may in turn be modified in XML transformer 127 in accordance with one or more transforms specified in ADD_TRANSFORM.

The portion of FIG. 11 labeled 1102 specifies that the view ku$_table_view 1101 is a view each of whose rows contain an object 121 that has the UDT ku$_table_t. Each row in ku$_table_view must have a primary key, and the OID function in 1102 specifies that the primary key will be the value of the field obj_num 1005 in ku$_table_t 1001. The select . . . from clause (1103, 1115) indicates what data is being aggregated by the view and how that data will be mapped onto fields in an object of UDT ku$_table_t 1001.

from portion 1115 of the select . . . from clause specifies the tables from which ku$_table_view 1101 obtains most of its information; as will be seen later, some of the information from the tables in the from clause is used to obtain information from other tables. There are three such tables: the system table tab$, represented by t in ku$_table_view 1101, and two other aggregation object views, ku$_schemaobj_view, represented by o in view 1101, and ku$_storage_view, represented by s. where clause 1116 indicates the conditions under which a row of view 1101 will contain information from rows of the tables in the from clause. The (+) operator is an outer join operator; it states that there will be a row in view 1101 corresponding to a row of the table on the left-hand side of the (+) operator even if there is no corresponding row of the table on the right-hand side of the (+) operator; if there is a corresponding row, the row in view 1101 will contain fields from both rows. Thus, the where clause at 1115 states that there will be a row in view 1101 for every row in tab$ and the row will contain fields from ku$_schemaobj_view if there is a row in the latter view whose obj_num field belonging to the obj_num column has the same value as the value of the field belonging to the obj # column in the current row in tab$ (1117). The four lines labeled 1119 indicate that the row in view 1101 will also contain fields from ku$_storage_view if the system seg$ table underlying ku$_storage_view has a row for the table specified by the current row in tab$.

The lines labeled 1121, finally, are a security clause that ensures that when API 120 is being used by a non-privileged client, it will return metadata only for those objects which belong to the user. It specifies that the user ID (UID) of the client invoking API 120 must be that of the owner of the object that is represented by the row in tab$ or the UID is 0, which is the system user ID, or the client has the SELECT_CATALOG_ROLE, which permits the client to read the entire data dictionary.

Continuing with the select portion 1103 of object view 1101, the values specified in portion 1103 correspond to field names in UDT 1001 by order; thus, the constants at 1104 in object view 1101 correspond to and are the values for the fields db_version, major_version, and minor_version in UDT 1001. The values at 1105, which are the object number of t, the schema object, and the storage object, similarly go into fields 1005, 1007, and 1009 of the ku$_table_t object.

Getting the value for ts_name field 1011 is a bit more complicated; it comes from another view, ku$tablespace_view, and as specified in the where clause, it is located in that view by means of the value of t. ts#. At 1109, the values for the portion of the ku$_table_t object labeled 1107 are set forth; they are all from fields of t.

The remainder of select clause 1103 is devoted to obtaining values for the three fields col_list 1013, con_list 1015, and part_obj 1017. The value of each of these fields is an object of a UDT whose contents come from another aggregate view 111; thus, col_list has the DT ku$_column_list_t and as indicated at 111, the values are to be selected from a view ku$_column_view where the object number in the view is the same as the object number in t. In order to give the values from ku$_column_view the proper UDT for col_list,ku$_table_view does a cast, that is, it arranges the values as required for the UDT ku$_column_list_t. The cast is necessary here because ku$_column_list_t is a nested table of column objects. It is necessary for the same reason with regard to the value obtained at 1113 for con_list 1015. The value of part_obj 1017, on the other hand, has the UDT ku$_part_obj_t, which is not a nested table, so no cast is necessary.

Figure 15:
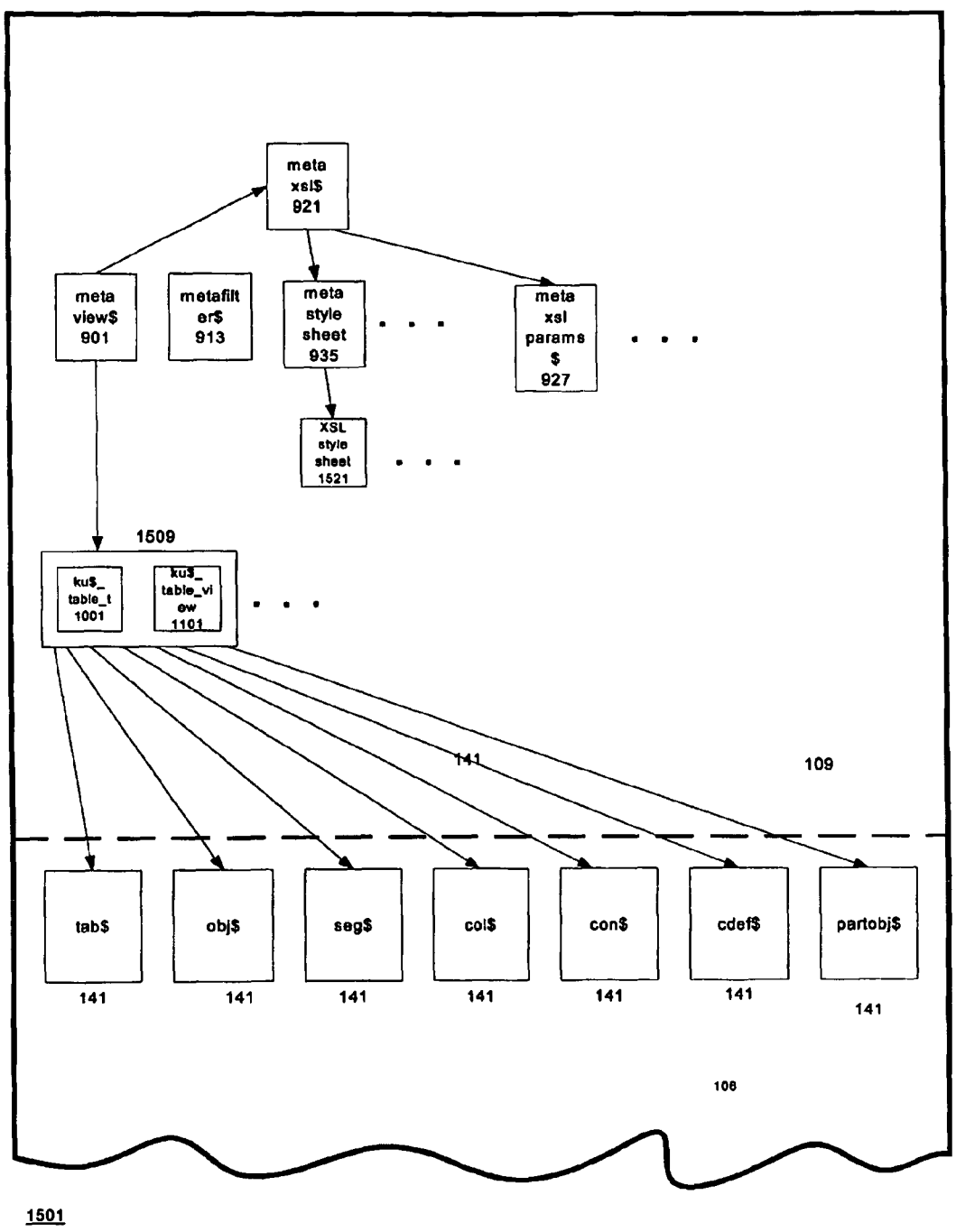
FIG. 15 is a detailed diagram of aggregation metadata 109.

Details of Aggregation Metadata 109 and its Relationship to Tables in System Tables 107: FIG. 15

FIG. 15 shows details of how the table, view, and UDT objects in aggregation metadata 109 relate to each other and to tables in system tables 107. As explained above, metaview$ 901 associates an object class, metadata model, metadata version tuple with a UDT and object view for that class; shown at 1509 are the UDT 1001 and the object view 1101 for the TABLE class of objects; as further shown by the arrows connecting box 1509 with tables in system tables 107, object view 1101 loads the fields of objects of UDT 1001 with metadata obtained from the tab$, obj$, seg$, col$, con$, cdef$, and partobj$ system tables, and thus aggregates the metadata for a table object into a single object of UDT 1001.

Each row in metaview$ 901 may be associated with one or more rows in metaxsl$ 921. Each row in metaxsl$ represents one transform for a metadata model and includes both the name of the transform and the location of the row containing the XSL for the transform in metastylesheet 935. Each row in metaxsl$ 921 is further associated with one or more rows in metaxslparams 925, each row of which specifies a parameter for an XSL style sheet specified by a metadata model, transform name, and object type tuple. metafilter$ 913, finally, associates an object class and metadata model with a named filter.

Notes on the Implementation of UDTs and Table Views for the TABLE Class

While ku$_table_t 1001 and ku$_table_view 1101 show how data aggregation works in a preferred embodiment, they are merely exemplary. The actual implementation of the UDTs and object views that aggregate metadata for TABLE objects in the preferred embodiment is substantially more complicated. Tables are the most complex objects with respect to their metadata; i.e, one could have a sub-partitioned, index-organized table with LOB, UDT, nested-table columns, etc. However, the vast majority of tables defined by users of DBMS 103 are relational tables with simple scalar columns. Gathering up all the metadata for the complex case is performance intensive, so the implementation defines a number of mutually exclusive object views that add increasing complexity. The UDTs used to aggregate the metadata of the vast majority of table objects are found in the first and simplest object view, so performance for the common path is good. Here are the table views that the current implementation defines for the TABLE class of objects:

ku$_htable_view—heap-organized relational tables: No IOTs, LOB, object, nested-table columns, no partitions ku$_phtable_view—Same as above, but can be partitioned.

ku$_fhtable_view—heap-organized with no column type restrictions: can have LOB, object, nest-table cols, no IOTs ku$_pfhtable_view—Same as above, but can be partitioned.

ku$_iotable_view—Index-Organized tables (IOTs): no column restricitions: no partitions ku$_piotable_view—Same as above, but can be partitioned.

For a particular set of filters, the mdAPI knows which view(s) must be queried to cover the full potential set of objects to be returned.

An Example of Operation of System 101: FIGS. 12-14

The following example will show how system 101 uses UDT 1001 and view 1101 for TABLE objects to retrieve information about a table named SCOTT.BONUS, expresses the information as an XML document, and uses an XSL script to transform the XML document into creation DDL for the table. FIG. 12 shows the creation DDL for SCOTT. BONUS. DDL 1201 consists of a single CREATE statement 1201; statement 1201 has two parts: at 1203 is seen a logical specification of the table; at 1211 is seen a specification of a set of attributes that specify how DBMS system 103 is to set up the table. Logical specification 1207 indicates that the table has four columns. There is a row in the table for each employee; in a row, the field in the first column of SCOTT. BONUS, named ENAME, is the employee's name, the field in the second column, JOB, is for the employee's job code; the field in the third column, SAL, is for the employee's salary; the field in the fourth column, COMM, is for the employee's commission. As can be seen at 1209, for each column, the data type of the value in the column's fields is specified.

When the information in creation DDL 1201 is compared with the fields in ku$_table_t definition 1001, it is seen that the information in the definitions of the columns at 1207 corresponds to the field col_list 1013 of ku$_table_t, that the information at 1213 in DDL definition 1201 corresponds to the fields pct_free, pct_used, initrans, and maxtrans in 1012, that the information at 1213 corresponds to the field storage 1009, and that the information at 1217 corresponds to ts_name 1011. In the preferred embodiment, the view ku$_table_view 1101 is used to collect this and other information about the table SCOTT.BONUS from data dictionary 106.

FIG. 13 shows a portion 1301 of the XML document which XML generator 125 makes from the UDT ku$_table_t object which contains the information about SCOTT.BONUS. Any XML document made from a ku$_table_t object will resemble XML document 1301, differing only as determined by differences in the information in the ku$_table_t object. Turning to FIG. 13, XML employs nested constructs. Each construct has the form <construct_name> construct_content </construct_name> where construct_content may include other constructs. Thus, in document 1301, the outermost construct is <TABLE_T> . . . </TABLE_T> 1303. Within construct 1303 are constructs corresponding to the fields of the ku$_table_t object that have values; the contents of the construct is the value of the field in SCOTT. BONUS. In FIG. 13, the constructs have been labeled with reference numbers in parentheses indicating the corresponding fields in ku$_table_t Thus, <DB_VERSION> . . . </DB_VERSION> construct (1002) contains the value of field 1002 of ku$_table_t.

Where a field has a user-defined type in ku$_table_t, all of the fields of the user-defined type appear in the structure in XML 1301 corresponding to the field; thus the SCHEMA_OBJ> . . . </SCHEMA_OBJ> construct corresponding to schema_obj field 1007, which has the UDT ku$_schemaobj_t has nested in it constructs corresponding to the fields of the UDT ku$_schemaobj_t, and the same is the case with the XML constructs corresponding to storage 1009 and to COL_LIST 1013. Since COL_LIST's UDT ku$_column_list_t is defined as a nested table of objects that have the UDT ku$_column_t and that represent columns in the table SCOTT.BONUS, there is nested in <COL_LIST> . . . </COL_LIST> a structure <COL_LIST_ITEM> . . . </COL_LIST_ITEM> for every column in that table; in FIG. 13B, only the structure 1305 for the first column is shown.

FIG. 14 shows a portion 1401 of the XSL-T stylesheet which transforms the <COL_LIST> . . . </COL_LIST> XML structure made from the ku$_table_t object containing the metadata for SCOTT. BONUS into column definition 1207 in the CREATE DDL for SCOTT. BONUS. Like XML, XSL is made up of nested constructs, with the beginning of a construct being marked by <construct_name> and the end being marked by </construct_name>. The constructs specify actions to be performed on constructs from the XML document being transformed, in this case the XML construct <COL_LIST> . . . </COL_LIST> and the XML constructs nested therein.

At 1403 is seen the beginning and end of an XSL template construct that processes <COL_LIST> . . . </COL_LIST>. The first nested construct, at 1405, is a text construct that simply outputs the text it contains, in this case, "(", the left parenthesis for column list 1207 in CREATE DDL 1201. The next nested construct, for each, at 1407, is a loop which processes each COL_LIST_ITEM in the XML in turn. At 1409, the COL_LIST_ITEMs are sorted by the value of the XML COL_NUM item; then at 1411, the "that precedes the column name in the DDL is output, followed by the value of the XML NAME construct, which is the name of the column, and the" that follows the column name.

At 1415, a variable that indicates the class of object for which the DDL is being generated is tested; as indicated at 1417, if the object has the class TABLE, the processing continues at the template for the XML TYPE_NUM construct. The beginning and end of the template have the reference number 1421. At 1423, what is done depends on the value in the XML TYPE_NUM construct, which is 1 for the first column. The value 1 indicates that the column has the VARCHAR2 data type, so that keyword is inserted into the DDL, as shown at 1425. At 1427, processing is transferred to a template 1429 for either the XML PRECISION_NUM construct or the XML LENGTH construct. The latter construct contains the value that specifies the length of the VARCHAR2 data item, here 10 characters. Template 1429 is found at the bottom of FIG. 14B. At 1431, the left parenthesis for the length expression is output; at 1433, the value of the LENGTH construct itself is output; at 1435, the right parenthesis. When template 1429 is completely executed, processing is transferred back to template 1421, which also finishes execution, transferring control back to template 1403, which outputs the comma following the length specifier and thereby finishing the first column specification in 1207, namely "ENAME" VARCHAR2 (10). Template 1421 then processes the other three columns, with processing being performed generally as just described. When all of the columns have been processed, template 1421 outputs the right parenthesis for column definition 1207 at 1439. XSL-T scripts are used in generally the same fashion to transform constructs from XML document 1301 into the rest of CREATE DDL 1201. For example, the part of CREATE 1201 labeled 1213 is transformed from the portion of XML document 1301 labeled (1012), the part labeled 1215 is transformed from the portion of XML document 1301 labeled (1009), and the part labeled 1217 is transformed from portion (1011) of XML document 1301.

As can be seen from the foregoing, system 101 can handle any kind of metadata. User-defined types and object views provide a completely general mechanism for reading metadata from objects in any repository of metadata, an XML document can be generated from the contents of any object that contains metadata, and an XSL stylesheet can be made which will transform the XML document into any form that is desired. Where a transform is particularly useful, as is the transform to creation DDL, it may be provided as part of system 101 and system 101 may provide the client with the output of the transform; otherwise, system 101 will provide the XML document and the client can apply any transform it wishes to the XML document. Moreover, as previously pointed out, the principles employed in the design and implementation of API 120 may be employed not only to aggregate metadata, but to aggregate any class of information that is stored in a number of objects in a database system.

Overview of Abstract SXML

While the full XML produced by the techniques described in U.S. Pat. No. 6,708,186, Claborn, et al., Aggregating and manipulating dictionary metadata in a database system, is adequate for the purpose for which it was originally intended, namely generating creation DDL for a database object from the XML made from the object's metadata, it is unsuited for a number of other purposes such as using the XML to determine how the metadata for one database object differs from that of another database object and manipulation of the XML by human beings. The problems of full XML stem from two difficulties:

full XML describes a database object as it exists at a particular moment of time in a particular Oracle relational database system;

Full XML is a complete description of all of the metadata for the object, and thus contains much information that is simply not of interest to human beings trying to understand the object represented by the full XML.

The usefulness of full XML is thus limited by its particularity, length, and complexity.

To overcome these difficulties, the system described in U.S. Pat. No. 6,708,186 has been improved by modifying it so that it outputs an XML which has been abstracted from full XML to reduce full XML's length, particularity, and complexity and produce an abstract XML which abstracts away from the particularity of full XML. This abstract XML will be termed in the following SXML, for simplified XML. SXML has the following properties:

Comprehensibility. SXML is easily comprehensible by an experienced SQL user. SXML has this property because its tags and values are SQL keywords, the names of productions in a BNF description of SQL syntax, or the names of SQL objects. There are no binary-encoded values or implementation-specific tags in SXML.

Relevance. SXML is directly relevant to creation DDL. It contains all of the elements of an object's metadata which may be directly specified by a user in creation DDL and only those elements. It does not contain such artifacts of the internal representation of the database object as object numbers, time stamps, or internal column numbers.

Human editability. Because SXML is both easily comprehensible and directly relevant to creation DDL, it is easily edited by humans.

Comparability. As much as possible, SXML has one and only one way of expressing a property of an object's metadata. Because this is so, SXML for an object from one database may be compared with the SXML for the object from another database.

In the following, a database object will be introduced which will provide an example for a comparison between full XML and SXML. Then the full XML and SXML for the object will be presented. Thereupon, the new conversion and comparison operations made possible by SXML will be presented.

An Example Database Object

The Table CONSTR_TAB: FIG. 16

An example database object which will be used as an example in the following discussion of SXML is shown at 1601 in FIG. 16. The object is a table called CONSTR_TAB which belongs to the schema SCOTT. As shown at 1601, the table has four columns, A 1603(1), B 1603(2), C (1603(3)), and D1603(4). A row 1605(i) in CONSTR_TAB has a field 1605(1,j) for each of the columns. Each of the columns has a numeric data type and a constraint, that is, a property which a value in a field belonging to the column must obey. The constraint for column A is that there must be a value in the column in every row in the table; the constraint for column B is that the value of the column is the primary key for the rows; the constraint for column C is that each value of C in the table must be unique with respect to the table; and the constraint for column D is that each value of D must equal 5.

The creation DDL (data definition language) for the table CONSTR_TAB is shown at 1607. A database system which is able to interpret the standard SQL language for interacting with relational database systems will respond to creation DDL 1607 by creating the metadata for table 1601 in data dictionary 106 of DBMS 103. At 1609, the CREATE TABLE operation is specified, along with the schema name for the schema the table belongs to and the name for the table itself. Then at 1611 comes a list of the columns, each with its name and data type. Finally, there are the constraints 1613 and 1615. There are two ways of defining these, one, as shown at 1613, by including the constraint in the column definition; the other, as shown at 1615, by including a list of constraint definitions. Each constraint definition may include an identifier for the constraint and must include the constraint's type and the column the constraint is related to.

The full XML for CONSTR_TAB: FIG. 17

FIG. 17 shows the first 90 lines of the full XML 1701 for CONSTR_TAB 1601's metadata. The entire full XML is over 470 lines long. Of the 47 lines of full XML 1701 in FIG. 17A, only two lines contain logically necessary information, namely the line labeled 1709 which indicates that SCOTT is the owner of the table and line 1711, which indicates that the table's name is CONSTR_TAB. The remaining information is details of the metadata for a particular instance of the table CONSTR_TAB in a particular Oracle relational database management system. Beginning at 1703, the lines indicated by that reference number provide information that applies to the entire table, including versions for the table metadata, the object number for the instance of the table in the relational database system that contains the table, and at the bottom of the page, the table space the system belongs to, the block size for the table, and its object number again. At 1705 is the schema object for the table; included in it are again the object number, time stamps for the table object, the stable object's status, a flag value, and some spare fields. Then at 1707 is a detailed description of the storage for the table.

Continuing with lines 48-90 in FIG. 17B, the only lines of lines 48-90 which are necessary for the logical description of the table are the lines labeled 1717, which specifies column A's name, 1719, which specifies the column's type, 1721, which indicates the column's constraint, and 1723, which indicates whether the constraint is enabled. Other information in the lines includes more information 1703 about the table, the beginning of the list of columns at 1713, information about column A in the lines indicated by 1715, and information about the NOT NULL constraint for the column. As is immediately apparent from FIG. 17, most of the information in the full XML representation of CONSTR_TAB table 601 is not required to describe the table in SQL or to make the creation DDL for the table. Moreover, complete understanding of the full XML representation requires a detailed understanding of the manner in which the Oracle RDBMS in which CONSTR_TAB is implemented implements tables generally.

The SXML for CONSTR_TAB: FIG. 18

Figure 18B:
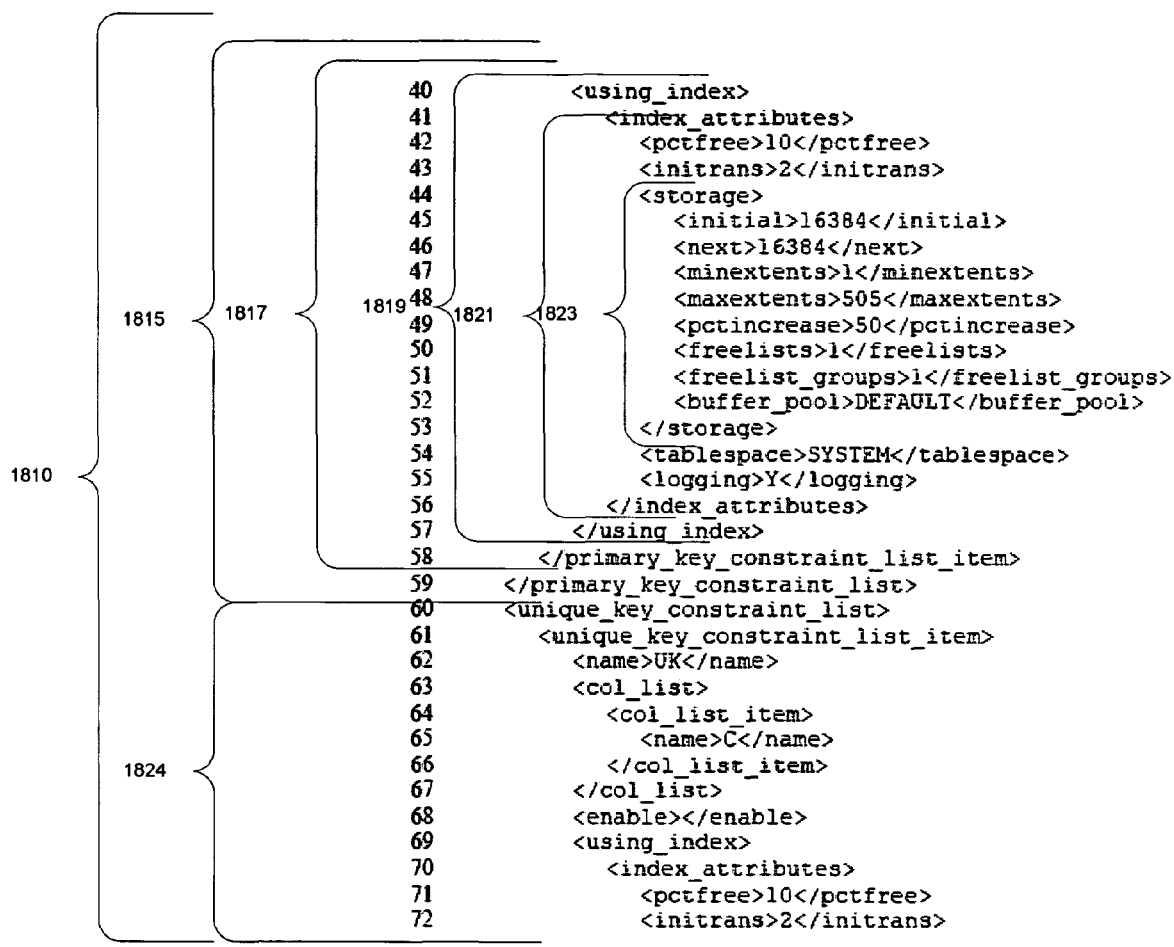

FIGS. 18A-C show the complete SXML 1801 for CONSTR_TAB 601's metadata. SXML 1801 for the table's metadata is only 108 lines long, or less than ¼ the length of the full XML for the table's metadata. Starting at the top of the table, the information about the entire table has been reduced to two lines, 1801 and 1803, indicating the schema to which the table belongs and the table's name. Then comes column list 1805, which extends from line 4 through line 24 and contains a column description 1807 of each column. The description gives the column's name and datatype. In SQL, the column description may also include a constraint 1809, which may be named. Constraint 1809 has the name 'NN'. Constraints included in column descriptions are termed in the following column constraints. If the column has a NOT NULL constraint, the constraint must appear in the column's description.

Constraints may also be specified in SQL in a table constraint list. The SXML for a table constraint list appears at 1810. Constraint list 1810 is divided into sublists 1811, 1815, and 1824 for each type of constraint, Each constraint in a sublist has a constraint description 1813 and 1817. In SQL, a constraint may be written either in the column description or the constraint list, with the exception of the NOT NULL constraint, which must be included in the column description. In SXML, the goal of expressing a given property in one and only one way is attained by requiring all constraints but NOT NULL constraints to be included in the constraint list 1810. Thus, the NOT NULL constraint for column A is described in column A's column list item 1807, while constraint list 1810 contains the constraints for columns B, C, and D. The check constraint list for the check constraints is at 1811, with a single item for column D's check constraint at 1813; the primary key constraint list is at 1815, with a single item for column B's primary key constraint at 1817; and the unique key constraint list is at 1824, with a single item for column C's unique key constraint. Continuing with the details of primary key constraint list item 1817, item 1817 lists the constraint's name, the columns it applies to, and whether it is enabled. Item 1817 further specifies in this case whether there is an index for the field. This is specified at 1819. The specification includes the index attributes at 1821 and a description of the storage for the index at 1823. Unique key constraint list 1824 is organized similarly to primary key constraint list 1815. The remainder of SXML 1801 specifies the physical properties for the table's storage at 1825. Included in this specification is an indication of how the storage will be organized, what its attributes are (1826), and a description 1827 of the storage itself. As will be explained in more detail later on, a user of the metadata API may use parameters to specify what is contained in the SXML for an object beyond the minimum required to produce the creation DDL for the object.

When SXML 1801 is compared with full XML 1701, it will be immediately noted that there is nothing in SXML 1801 which corresponds to such instance-specific information in full XML as metadata version numbers, object numbers, time and date stamps, fields with bit values representing system flags, mappings of objects onto files, block size, caching hints, system column numbers, and so on. Even where SXML specifies the physical properties of table 1601, it does so in logical terms rather than in terms of the physical properties of the storage for a given instance of the table. Moreover, the tags and values in SXML 1801 are almost all either SQL keywords, the names of productions in the BNF syntax for SQL, or the names of objects that are described in SQL. Consequently, SXML 1801 is readily understood by anyone who is reasonably fluent in SQL.

Translating Full XML into SXML: FIG. 19

In a presently-preferred embodiment, the SXML for an object's metadata is produced by applying XSL-T style sheets to the full XML for the object's metadata. In other embodiments, the SXML for the metadata may be produced directly from an object view for the user-defined type used to access the metadata in the same manner that the full XML is produced in U.S. Pat. No. 6,708,186. In still other embodiments, the metadata may be accessed using features in Oracle relational database systems which integrate data contained in XML documents with data contained in relational database tables. Among these features are views which permit the data in a database table to be accessed as though it were in an XML document. XSL-T style sheets might be applied to such views in the same fashion as they are applied to full XML in the presently-preferred embodiment. Additionally, a user may have taken advantage of the human readability of SXML to take automatically-produced SXML and edit it as required to produce modified metadata or even to produce SXML for an object's metadata from scratch.

FIG. 19 shows a portion 1901 of the style sheet used in a preferred embodiment to translate a description of a table object in full XML to the corresponding description in SXML. Beginning at the top, as shown at 1903, comments are indicated in XSL-T by <!-- ... -->. XSL style sheets are made up of templates. A template is a portion of an XSL-T style sheet that corresponds to a construct in an XML document and defines how that construct is to be translated. Thus, the template shown at 1905 matches the construct TABLE_T which is found at the beginning of a full XML representation of a table (see line 3 in FIG. 17). XML constructs nested in the full XML TABLE_T construct are translated by this template or by templates referred to in this template. If a construct is not translated by the template, it does not appear in the translation.

The first construct to be translated is TABLE_T itself, which, as shown at 1905, is replaced by the SXML element name TABLE. TABLE is then followed by two attributes which specify the text that follows table at line 1 in FIG. 18A. The next item in portion 1901 is at 1909, where a template named SCHEMA_OBJ is selected to deal with the XML construct SCHEMA_OBJ 1705 in the full XML of FIG. 17. This template appears at 1923 in FIG. 19C. As can be seen there, the template replaces schema object 1705 in the full XML with the schema and name constructs at lines 2 and 3 of the SXML. The schema element is constructed at 1925 and is given the value SCOTT from the full XML element OWN- ER_NAME (1709) at 1927 and the name element is constructed at 1931 and given the value CONSTR_TAB from the full XML element NAME (1711) at 1931. The style sheet ignores the remainder of SCHEMA_OBJ construct 1705.

At 1910 is an XSL-T branching construct which determines from the value of the PROPERTY construct at line 57 of FIG. 17 whether the table whose metadata is contained in the full XML is an object table, an XMLType table, or an ordinary relational table. The template that is to be applied next depends on the value of PROPERTY. In this case, table 1601 is a standard relational table, so the CreRelTable template is called. That template appears at 1911 in FIG. 19B. As is clear from 1805 in FIG. 18A, the construct following the name construct is col_list construct 1805, so the first thing the CreRelTable construct does is translate the corresponding COL_LIST construct 1713 into col_list construct 1805. As shown at 1912, this involves excluding certain kinds of hidden columns. For each COL_LIST_ITEM in the full XML document which does not represent one of the excluded columns, CreRelTable calls another template, ColumnDefinition, which translates the COL_LIST_ITEM in full XML 1701 into the corresponding col_list_item in SXML 1801. The remaining constructs in full XML 1701 are dealt with similarly. The constraints portion of full XML 1701 (not shown in FIG. 17) is handled by the TableConstraints template that is called at 1913; the only other portion of CreRelTable 1911 that is relevant to the translation of full XML 1701 for table 1601 into the table's SXML is shown at 1919, where the template TablePhysicalProperties is called. This template produces physical properties construct 1825 of SXML table 1801 from the information (not shown) at the end of full XML 1701 that describes table 1601's storage.

Using SXML to Compare Metadata from Different Tables: FIGS. 20-23

Figure 23:
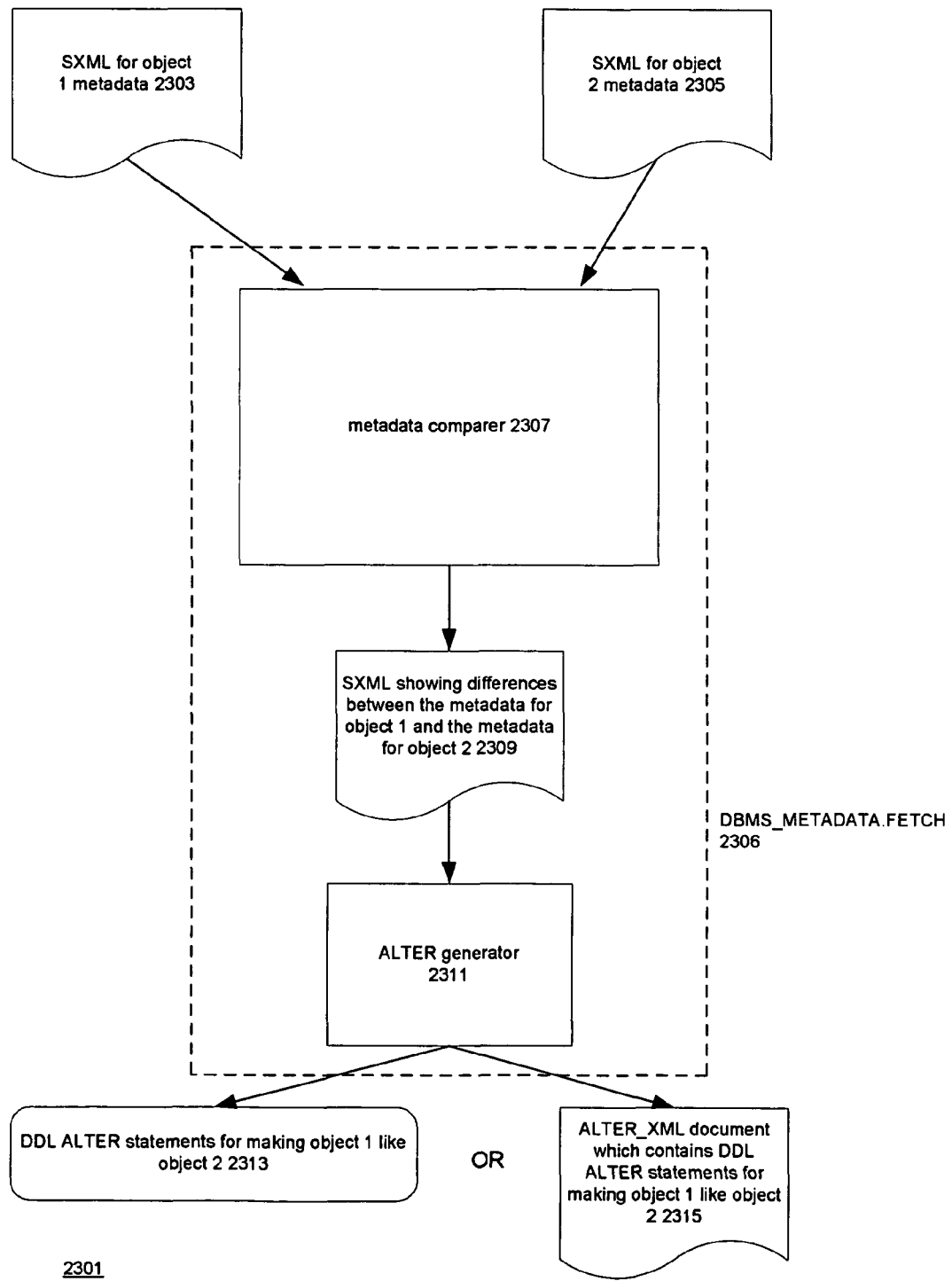
FIG. 23 is a block diagram of an apparatus for determining the differences between the metadata for two tables.

As already explained, an important property of SXML is that it in general has one and only one way of expressing a property of an object's metadata. Because this is so, the metadata of two objects may be compared by making an SXML file for each of the objects that represents the metadata for the object and then comparing the two SXML files. FIG. 23 shows how this may be done. Metadata comparison apparatus 2301 is implemented in a preferred embodiment in software that executes in RDBMS 103. The software includes a metadata comparer 2307 which takes two SXML documents as inputs. SXML document 2303 represents the metadata of object 1; SXML document 2305 represents the metadata of object 2; comparer 2307 compares documents 2303 and 2305 to produce a third SXML document 2309 which shows the differences between the metadata of object 1 and the metadata of object 2. While SXML difference document 2309 is useful in itself, it is rendered even more useful by ALTER generator 2311, which takes difference document 2309 as its input and produces either a set of DDL ALTER statements 2313 which, when applied to object 1 will make the object like object 2 or an ALTER_XML document 2315 which contains the set of DDL alter statements. Either the ALTER statements 2313 or the ALTER_XML document can be used to make object 1 like object 2.

Example of Comparison of SXML Documents: FIGS. 20-22

FIGS. 20-22 provide a concrete example of how comparison of SXML documents works.

FIG. 20 shows the SXML for a first table SCOTT. EMP 2001; FIG. 21 shows the SXML for a second table SCOTT. EMP 2101; as shown at 2003, 2005, and 2103, the tables are nearly identical; the differences are the following:

As shown at 2003, table 2001 has a column JOB that does not exist in table 2101; and As shown at 2005 and 2103, the columns ENAME in the two tables have different lengths; in table 2001, the field is 10 characters long; in table 2101 it is 12 characters long.

When SXML document 2001 is input to comparer 2307 as SXML 2303 and SXML document 2101 is input to comparer 2307 as SXML 2305, the result produced by comparer 2307 is SXML document 2201 of FIG. 22. Comparer 2307 has detected the above differences and added attributes to document 2201 to indicate what they are. Thus, at 2203, "value1="10"" has been added to the length specifier for ENAME to indicate that ENAME has different lengths in documents 2001 and 2101 and at 2205, "src="1"" has been added to indicate that the source of this column is document 2001, i.e., that the column is not present in both.

Manner of Comparing SXML Documents

The manner in which metadata comparer 2307 compares SXML documents and produces an SXML difference document may be described as follows. The technique takes advantage of the fact that an XML document can be described as a tree of nodes in which each node is an XML construct. For example, SXML document 2001 has the TABLE construct as its root node; children of that root node are the nodes for the SCHEMA, NAME, and COL_LIST constructs; the COL_LIST_ITEMs are children of the COL_LIST construct, and so on.

1. A difference document is an SXML document. The XML schema that defines the SXML syntax for a particular object type also defines the syntax for the object type's difference document and can be used to validate it. As shown at line 1 of 1801 in FIG. 18A, all SXML documents have a "version" attribute on their top-most node. SXML difference documents can also have attributes on their descendant nodes that identify the differences between the SXML documents being compared.
2. A difference document is generated from two source SXML documents by comparing the nodes of the two documents. Before explaining the comparison rules, we introduce some terminology:

A simple element is an element with text content only, e.g., LENGTH. By contrast, a complex element (e.g., TABLE) contains subelements.

One kind of complex element is a collection element, i.e., an element whose children all have the same element name. COL_LIST is a collection element. We will call its children collection member elements (or simply, member elements.)

A simple location path for an element in a SXML document is the element name prefixed by '/' and its parent, prefixed by '/' and its parent, etc. E.g., the simple location path for a table's name is TABLE/NAME. Note that member elements of a collection have the same simple location path, e.g., every COL_LIST_ITEM in a table's COL_LIST has the following simple location path: TABLE/COL_LIST/COL_LIST_ITEM.

3. Nodes of the source documents are compared using the following matching rules:
   a. Simple elements match if they have the same element name and content, e.g., <LENGTH>12</LENGTH> matches <LENGTH>12</LENGTH>.
   b. Complex elements must have the same simple location path (e.g., TABLE/PHYSICAL_PROPERTIES/SEGMENT_ATTRIBUTES) in order to match. If they are not collection elements or member elements, this is enough. (Note that the complex elements may match even though some of their child elements don't.)
   c. Collection member elements match if one or more specific subelements match. (The set of subelements that must match is specified by annotations in the XML schema.) Example 1: two table COL_LIST_ITEM elements match if their NAME child elements match. Example 2: two bitmap join index JOIN_LIST_ITEM elements match if their SCHEMA, NAME and COL child elements match. Example 3: two index COL_LIST_ITEM elements match if (a) their NAME child elements match and (b) they have the same position in the collection.

d. Some collection elements match if they simply satisfy rule b, above (if they have the same simple location path). E.g., TABLE/COL_LIST matches TABLE/COL_LIST. Other collection elements must satisfy the additional criterion that all their child elements match. E.g., for two INDEX/COL_LIST elements to match they must have the same COL_LIST_ITEM members in the same order. (An index on foo(a,b) is not the same as an index on foo(b,a).) Once again, the rules for particular collection elements are specified in the XML schema for the collection.

4. The nodes of the two source SXML documents are compared in the following order. First the root nodes are compared, then the children of the root nodes, then their children, etc. (This is a logical description; the actual algorithm used by the code can be different, so long as it produces the same result.)

a. If the top-most nodes of the two documents do not have the same element name (e.g., TABLE), then the comparison fails. In other words, you can't compare two documents of different object types.

b. If the nodes in the two documents match, the node (either one) is copied to the difference document.

c. If the node is in one document but not in the other, the node is copied to the difference document and given the attribute "src". The attribute value is "1" or "2" depending on which source document contained the node. E.g., <CONSTRAINT src="1"> means that the constraint node is in document 1 and not in 2.

d. For simple elements, if their contents do not match, then the element and its content is copied from the first source document, and the element is given the attribute "value1". The attribute value is the element content from the first source document.
E.g., document 1: <LENGTH>12</LENGTH>
document 2: <LENGTH>9</LENGTH>
difference document: <LENGTH value1="12">9</LENGTH> e. For the top-most elements, if their "version" attributes have different values, then in the difference document (1) the "version" attribute gets its value from document 2, and (2) the node is given an additional attribute "version1" with the value from document 1. E.g.,
document 1: <TABLE version="1.0">
document 2: <TABLE version="1.1">
difference document: <TABLE version="1.1" version1="1.0"> f. No attribute is added to an element in the difference document if one of the element's ancestors (other than the top-most element) already has an attribute. (This rule is probably implied by the others. Its purpose is to eliminate unnecessary attributes. E.g., if table 1 has a COL_LIST_ITEM named "FOO" which isn't present in table 2, we simply mark the COL_LIST_ITEM with src="1". There's nothing to be gained by also marking their LENGTH, DATATYPE, etc. child elements.)

APIs for Comparing and Translating the Metadata of Objects

The database system in which comparison apparatus 2301 is employed provides programmatic and browsing APIs for translating fill XML to SXML, producing SXML difference documents, and producing the ALTER DDL required to convert the metadata for one object to the metadata for another object.

From a programmer's point of view, system 101 as modified for SXML and the operations associated with it retains the open-fetch-close programming paradigm described in U.S. Pat. No. 6,708,186. That description is repeated below with the modifications made to it to accommodate the SXML-related functions.

A program executed by a client will generally use the procedures and functions provided by API 120 as follows:

1. A call to 'OPEN' is made describing the class of object 105 for which metadata is being requested (tables, indexes, etc). A handle is then returned to be used in all subsequent operations for the set of objects for which metadata is being requested. As modified, two new versions of OPEN have been added, OPENC, which describes the class of object 105 whose metadata is to be compared, and OPENW, which describes the class of object 105 represented by an existing XML document that is to be converted to full XML, SXML, or DDL. In the following, the use of OPEN will be discussed first, and then the use of OPENC and OPENW.

2. 'SET_FILTER' is then called (perhaps multiple times) to further refine and restrict the set of objects to be fetched. This establishes the WHERE clause predicates on the query that will be executed against the appropriate aggregation view(s) 111. A large variety of filter criteria are available for each class of object; common ones are object name and schema expression matching. For tables, special filter criteria are available to specify heap storage only (no IOTs), non-partitioned, relational only (no object tables), etc. If specified, these allow query generator 123 to prune the set of object views to be queried for higher performance.

3. 'ADD_TRANSFORM' may optionally be called (perhaps multiple times) to specify various transformations that are to be executed on the full XML documents representing the metadata. The transformations are specified by means of XSL-T stylesheets. The caller may specify the URL of its own private stylesheet; for example, to remove or add a column to a table's metadata. Or, the caller may specify 'DDL' which tells API 120 to generate creation DDL for the object using its own stylesheets. Additionally, the caller may now specify 'SXML', which tells API 120 to generate SXML for the object using its own stylesheets. In all cases, a transform handle is returned. This handle is different from the handle returned by OPEN. It is used to further refine the transform as described in the next step.

4. 'SET_TRANSFORM_PARAM' may then be called (perhaps multiple times) using the transform handle from the previous step. This allows the caller to pass transform-dependent runtime values to the XSL-T stylesheet. Some of the various transform options that can be specified are: 'Don't include constraints', 'Don't include storage or tablespace clauses', 'Pretty print the output', 'Do/don't include the SQL terminator character (;)', 'Do/don't include package or type bodies with their specifications'. As will be described below, a number of new parameters have been added for the SXML transform.

5. Once the preliminary setup is complete, the calling program will loop, calling one of the various 'fetch' functions to retrieve and output the metadata for objects matching the selection criteria. Depending on the transform selected, the metadata will be output as a full XML document, as an SXML document, or as creation DDL.

6. The fetch functions return NULL when there is no more metadata for database objects that match the selection criteria specified in the open and filter routines. The CLOSE function should then be called with the handle from step 1. API 120 will then clean up any currently allocated resources.

OPENW and CONVERT

OPENW is the form of OPEN that is used when what is being done is transforming an XML document representing metadata for an object belonging to a particular class of object to another such XML document or to DDL. The transformations are done using XSL-T style sheets. Transforms may be specified as described above, but they operate on the XML document, not on the metadata itself. Because OPENW operates on an XML document and not the metadata itself, SET_FILTER cannot be used with OPENW. The function which performs the conversion is the 'convert' function, which will be described in detail below.

OPENC

OPENC is used to compare SXML documents representing metadata for objects belonging to a particular class of object. ADD_DOCUMENT is used to specify the 2 SXML documents to be compared, ADD_TRANSFORM is used to specify transforms to be applied to the SXML difference document that results from the comparison, and SET_TRANSFORM_PARAM is used to set parameters for the transform. As with OPENW, SET_FILTER may not be used with OPENC. The 'fetch' functions used with OPENC return the SXML difference document, the ALTER DDL specifying how one object's metadata is to be converted into the other object's metadata, or an XML ALTER document specifying the ALTER DDL.

The COMPARE Browsing API

The COMPARE browsing API encapsulates the OPEN and OPENC interfaces. The user specifies the class of object, the names of the two objects being compared, and their locations and returns the difference, which may take the form either of an SXML difference document, the ALTER DDL for the difference, or the ALTER XML document for the difference.

Details of the APIs.

Changes in the OPEN API

ADD_TRANSFORM now permits the caller to specify an SXML transform. When this transform is specified, the full XML produced from an object's metadata is translated by an XLS stylesheet into SXML. As would be expected from this change, SET_TRANSFORM_PARAM may now specify parameters for the SXML Transform. The parameters are shown in at 2401 in FIG. 24. For example, when SXML document 1801 was made, the PHYSICAL_PROPERTIES and STORAGE parameters were set to TRUE. When the SXML transform is specified, FETCH returns SXML.

The OPENW and CONVERT API

The OPENW API is as follows:

```
FUNCTION openw
    ( object_type IN VARCHAR2,
      version    IN VARCHAR2 DEFAULT 'COMPATIBLE',
      model      IN VARCHAR2 DEFAULT 'ORACLE'
    ) RETURN NUMBER;
```

OPENW specifies the type of object to be submitted and the object model. The return value is an opaque context handle.

Parameters object_type—the type of object to be submitted. The type may not be a heterogeneous object type.

version—the version of DDL to be generated by the CONVERT function. DDL clauses that are incompatible with the version will not be generated. Legal values for this parameter are 'COMPATIBLE'—(default) the version of the DDL corresponds to the database compatibility level.

'LATEST'—the version of the DDL corresponds to the database version.

A specific database version, e.g., '9.2.0'.

model—The API can support multiple views on the metadata such as Oracle proprietary, ANSI99, Common Warehouse Metadata (CWM). model specifies which view to use.

Returns an opaque handle to the write context. This handle is used as input to ADD_TRANSFORM, CONVERT, PUT and CLOSE.

The CONVERT API is as follows:

```
FUNCTION convert
    ( handle      IN NUMBER,
      document    IN sys.XMLType,
      format      IN NUMBER DEFAULT FULL_XML)
      RETURN sys.ku$_ddls
FUNCTION convert
    ( handle      IN NUMBER,
      document    IN CLOB,
      format      IN NUMBER DEFAULT FULL_XML)
      RETURN sys.ku$_multi_ddls
PROCEDURE convert
    ( handle      IN NUMBER,
      document    IN sys.XMLType,
      result      IN OUT NOCOPY CLOB
      format      IN NUMBER DEFAULT FULL_XML);
PROCEDURE convert
    ( handle      IN NUMBER,
      document    IN CLOB,
      result      IN OUT NOCOPY CLOB
      format      IN NUMBER DEFAULT FULL_XML);
```

CONVERT uses an XSL-T stylesheet to transform an input XML document. The function variants return creation DDL; the procedure variants can return either DDL, full XML or SXML depending on the specified transforms.

Parameters handle—the handle returned from OPENW.

document—the XML document containing object metadata of the type of the OPENW handle.

result—the converted document.

format—the format of the document, either DBMS_METADATA.SXML or DBMS_METADATA.FULL_XML (the default).

Returns

DDL to create or drop the object(s).

Usage

The CONVERT APIs may be thought of as the second half of the FETCH APIs, either FETCH_DDL (for the function variants) or the procedure FETCH_CLOB (for the procedure variants). There are two differences: (1) the FETCH APIs get their XML document from the database, while CONVERT gets its XML document from the caller; (2) FETCH_DDL returns its results in a sys.ku$_ddls nested table, while CONVERT returns a sys.ku$_multi_ddls nested table. The transforms specified with ADD_TRANSFORM are applied in turn, and the result is returned to the caller. The encoding of the XML document is embedded in its CLOB or XMLType representation. The version of the metadata is embedded in the XML.

The generated DDL is valid for the database version specified in the OPENW function. The transforms which may be used with OPENW are the DDL transform, which specifies a transformation from full XML to DDL, the MODIFY transform, which modifies values in an XML file, the SXML transform, which specifies a transformation from full XML to SXML, and the SXMLDDL transform, which specifies a transformation from SXML to DDL.

APIs for Comparing SXML Documents

OPENC

This OPEN API is used when the metadata for the objects represented by two SXML documents is to be compared.

```
FUNCTION openc
    (   object_type     IN VARCHAR2,
        version         IN VARCHAR2 DEFAULT
                        'COMPATIBLE'
    ) RETURN NUMBER;
```

OPENC specifies the type of objects to be compatred. The return value is an opaque context handle.

Parameters object_type—the type of object to be compared. Valid type names are CLUSTER, CONTEXT, DB_LINK, FGA_POLICY, INDEX, MATERIALIZED_VIEW, MATERIALIZED_VIEW_LOG, AQ_QUEUE, AQ_QUEUE_TABLE, RLS_CONTEXT, RLS_GROUP, RLS_POLICY, ROLE, SEQUENCE, SYNONYM, TABLE, TABLESPACE, TRIGGER, USER, VIEW.

version—the version of ALTER DDL to be generated if the 'ALTER' or 'ALTER_XML' transform is specified. DDL clauses that are incompatible with the version will not be generated. Legal values for this parameter are 'COMPATIBLE'—(default) the version of the DDL corresponds to the database compatibility level.

'LATEST'—the version of the DDL corresponds to the database version.

A specific database version, e.g., '9.2.0'.

Returns an opaque handle to the context. This handle is used as input to ADD_DOCUMENT, ADD_TRANSFORM, FETCH_xxx and CLOSE.

ADD DOCUMENT

This API permits the user to specify the SXML documents to be compared.

```
PROCEDURE add_document
    (   handle      IN NUMBER,
        document    IN sys.XMLType);
PROCEDURE add_document
    (   handle      IN NUMBER,
        document    IN CLOB);
```

ADD_DOCUMENT specifies an SXML document to be compared. ADD_DOCUMENT must be called exactly twice for the OPENC context, to specify the two documents to be compared.

Parameters handle—the handle returned from OPENC.

document—a document to be compared. The document must be of the type specified in OPENC.

Usage

The comparison interface allows you to compare exactly two SXML documents, so a program must call ADD_DOCUMENT exactly twice for each OPENC handle. In the comparison result, the document specified by the first call is document 1, that specified by the second call is document 2.

ADD TRANSFORM

The ADD_TRANSFORM API permits the user to specify transformations that are to be applied to the SXML difference document resulting from the comparison.

```
FUNCTION add_transform     IN NUMBER,
    (   handle             IN VARCHAR2,
        name               IN VARCHAR2 DEFAULT NULL,
        encoding           IN VARCHAR2 DEFAULT NULL)
        object_type
        RETURN NUMBER;
```

ADD_TRANSFORM specifies a transform that FETCH_xxx applies to the returned SXML difference document.

Parameters handle—the handle returned from OPENC.

name—the name of the transform. The following transforms implemented by this project are supported for this interface:

"ALTER"—the differences between the two documents specified by ADD_DOCUMENT are returned as a set of ALTER statements for making the first object like the second.

"ALTER_XML"—the differences between the two documents specified by ADD_DOCUMENT are returned in an XML document containing ALTER statements for making the first object like the second. The XML document also contains any requested parse item information.

encoding—the name of the NLS character set in which the stylesheet pointed to by name is encoded.

object_type—The object type to which the transform applies, by default the object type of the OPENC handle. Since the OPENC handle cannot designate a heterogeneous object type, this caller should leave this parameter NULL.

Returns an opaque handle to the transform. This handle is used as input to SET_TRANSFORM_PARAM and SET_REMAP_PARAM. Note that this handle is different from the handle returned by OPENC; it refers to the transform, not the set of objects to be retrieved.

Usage

By default (i.e., with no transform added) the comparison result is returned as an SXML difference document. You call ADD_TRANSFORM to specify an XSLT script to transform the result.

Set Transform Param

This API permits the user to specify how the ALTER transform behaves when the metadata for two tables is being compared and a column is present in one of the tables and not in the other and/or a column in one of the tables has a NOT NULL constraint and the corresponding column in the other of the tables does not have the constraint.

```
PROCEDURE set_transform_param
(    transform_handle  IN NUMBER,
     name              IN VARCHAR2,
     value             IN VARCHAR2,
     object_type       IN VARCHAR2 DEFAULT NULL);
```

Parameters
   transform_handle—either (1) the handle returned from ADD_TRANSFORM, or (2) the enumerated constant SESSION_TRANSFORM which designates the "ALTER" and "ALTER_XML" transforms for the whole session.
   name—the name of the parameter. See 2403 in FIG. 24.
   value—the value of the parameter.
   object_type—the object type to which the transform parameter applies. The caller should leave this parameter NULL.

FETCH xxx with SXML Document Comparison

When used with OPENC, FETCH may return either ALTER DDL or an SXML document representing the ALTER DDL. The APIs are the following:

```
FUNCTION fetch_ddl ( handle      IN NUMBER )
         RETURN sys.ku$_ddls;
FUNCTION fetch_clob ( handle     IN NUMBER)
         RETURN CLOB;
PROCEDURE fetch_clob (handle     IN NUMBER,
                      doc        IN OUT NOCOPY CLOB);
```

FETCH_xxx returns an object showing the differences between the two SXML documents specified by ADD_DOCUMENT. fetch_ddl returns the ALTER DDL to make the metadata for one of the objects like that for the other object; fetch_clob returns an ALTER XML document representing the ALTER DDL.

Parameters
   handle—the handle returned from OPENC.
   doc—a CLOB containing the ALTER XML document.

Returns
   the differences between the two SXML documents, either as ALTER DDL or as an ALTER XML document.

Browsing APIs for Comparing the Metadata of Objects

The browsing APIs are a set of APIs which combine the operations of making SXML documents representing the metadata of two objects, comparing the SXML documents, and producing output which describes the result of the comparison. There are three of the APIs: compare_sxml produces an SXML difference document; compare_alter produces ALTER DDL; compare_alter_xml produces an ALTER XML document.

```
DMBS_METADATA.COMPARE_xxx( )
FUNCTION compare_sxml (
         Object_type       IN VARCHAR2,
         name1             IN VARCHAR2,
         name2             IN VARCHAR2,
         schema1           IN VARCHAR2 DEFAULT NULL,
         schema2           IN VARCHAR2 DEFAULT NULL,
         network_link1     IN VARCHAR2 DEFAULT NULL,
         network_link2     IN VARCHAR2 DEFAULT NULL,
         RETURN CLOB;
FUNCTION compare_alter (
         object_type       IN VARCHAR2,
         name1             IN VARCHAR2,
         name2             IN VARCHAR2,
         schema1           IN VARCHAR2 DEFAULT NULL,
         schema2           IN VARCHAR2 DEFAULT NULL,
         network_link1     IN VARCHAR2 DEFAULT NULL,
         network_link2     IN VARCHAR2 DEFAULT NULL,
         RETURN CLOB;
FUNCTION compare_altersxml (
         object_type       IN VARCHAR2,
         name1             IN VARCHAR2,
         name2             IN VARCHAR2,
         schema1           IN VARCHAR2 DEFAULT NULL,
         schema2           IN VARCHAR2 DEFAULT NULL,
         network_link1     IN VARCHAR2 DEFAULT NULL,
         network_link2     IN VARCHAR2 DEFAULT NULL,
         RETURN CLOB;
```

Parameters
   object_type—the type of object to be retrieved and compared. This parameter takes the same values as the OPENC object_type parameter.
   name—the name of the first object in the comparison. It will be used internally in a NAME filter in a query to fetch the object. (If the name is longer than 30 characters, it will be used in a LONGNAME filter.)
   name2—the name of the second object in the comparison.
   schema1—the schema of the first object in the comparison. It will be used internally in a SCHEMA filter. The default is the current user.
   schema2—the schema of the second object in the comparison. The default is the value of schema1.
   network_link1—the name of a database link to the database on which the first object resides. If NULL (the default), the object is assumed to be in the database on which the caller is running.
   network_link2—the name of a database link to the database on which the second object resides. The default is the value of network_link1.

Returns
   the differences between the objects in the form specified for the API.

Other Implementations of the API

A relational database system which employs SXML to represent the metadata for an object will generally be able to perform the operations of making the SXML representation of the metadata, making creation DDL from an SXML representation, comparing SXML representations to produce an SXML difference document, and using the difference document to produce ALTER DDL or an SXML document representing the ALTER DDL. How these operations and their various combinations are expressed in the API involves many design choices, with the choices often being guided by factors such as the way APIs have been traditionally designed in the relational database system.

For example, in the API as just described, the OPENC interface works on two SXML documents. The API's FETCH_xxx routines return either the ALTER DDL for the differences or an XML document that contains the ALTER DDL. An alternative to this design is one in which the FETCH routines for OPENC generate an SXML difference document showing the differences between the input SXML documents. The translation from the SXML difference document to the ALTER DDL or to the ALTER DDL SXML document would be made in the alternative API by applying the OPENW-CONVERT API to the SXML difference document.

Conclusion

The foregoing Detailed Description has disclosed to those skilled in the relevant technologies how to make and use the inventive representations of the metadata for objects and has further disclosed the best modes presently known to the inventors of making and using the inventive representations. It will, however, be immediately apparent to those skilled in the relevant technologies that the principles of the inventions disclosed herein may be implemented in many ways other than the ones disclosed herein. In particular, the use of SXML in the representations of the metadata is particularly advantageous, given the wide acceptance of XML and the wide availability of tools for it, but any representations of the metadata may be used which are comparable in the sense that they may be used to produce a result that shows the differences between the metadata of two objects belonging to the same class of objects. Similarly, the wide distribution of relational database systems makes the use of the techniques of the invention particularly useful in relational database systems and further makes production of creation DDL and ALTER DDL from the result of the comparison of the representations of the metadata particularly advantageous, but the principles of the invention may be implemented in any database system in which objects in the database system are described by metadata.

Additionally, as already indicated above, a system using the inventive representations should include operations that produce the inventive representation, operations that compare two or more inventive representations, and operations that translate the inventive representation into forms that can be used in a database system to produce metadata for objects. There is of course any number of possible user interfaces by which the user can perform and control these operations. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A representation of database system metadata that defines an object in a database system, the object belonging to a class thereof that is defined in the database system metadata and the database system metadata defining the object such that the database system is able to query the object, the database system metadata having been fetched by an execution of a query on the database system, the representation of the database system metadata being automatically produced by the database system from the fetched database system metadata prior to any transformation to a data definition language, the representation of the database system metadata being included in a storage device accessible to a processor, and the representation of the database system metadata being characterized in that:
   the representation of the database system metadata for an object in the database system belonging to a particular class of classes comprises a simplified XML (SXML) representation, wherein
      the simplified XML (SXML) representation comprises an aggregate metadata of the object, in which the aggregate metadata is less than metadata for all properties of the object, and the simplified XML (SXML) representation does not include metadata, which is specific to an instance of the object that is used to produce the simplified XML(SXML) representation, or metadata, which is associated with a property of the object that cannot be specified by a user during creation of the object, and
      the simplified XML (SXML) representation is automatically comparable by the processor with another simplified XML (SXML) representation of the database system metadata for another object belonging to the particular class from a different database system to determine one or more differences between the database system metadata for objects in database systems.

2. The computer implemented method of clam 1, in which the representation of the database system metadata set forth in claim 1 further characterized in that:
   the simplified XML representation includes properties specified by the database system metadata for the object which the user may specify when creating the object but does not include the database system metadata specifying one or more internal representations of one or more instances of the object in the database system that produces the simplified XML (SXML) representation.

3. The computer implemented method of clam 1, in which the representation of the database system metadata set forth in claim 1, wherein the database system comprises a relational database system that responds to SQL and the simplified XML (SXML) representation is further characterized in that:
   the simplified XML (SXML) representation of the database system metadata employs constructs from BNF Syntax for SQL and SQL names for objects in the database system metadata but does not contain binary-encoded values or implementation-specific tags, whereby the simplified XML (SXML) representation of the database system metadata is easily read by human beings.

4. The computer implemented method of clam 1, in which the representation of the database system metadata set forth in claim 1, wherein
   the processor reads the representation of the database system metadata to produce database system metadata for other objects that are like the object.

5. The computer implemented method of clam 1, in which the representation of the database system metadata set forth in claim 1, wherein
   the database system that produced the representation of the database system metadata comprises a relational database system that respond to SQL, and
   the processor automatically produces creation DDL for the object from the representation of the database system metadata.

6. The computer implemented method of clam 1, in which the representation of the database system metadata set forth in claim 1, wherein
   the database system that produced the representation of the database system metadata comprises a relational database system that responds to SQL, and
   the processor compares the representation of the database system metadata produced by the database system for a first object of the objects with another representation of the database system metadata for a second object of the objects produced by a different database system and produces ALTER DDL which, when applied to the second object by the different database system, makes the second object like the first object.

7. The computer implemented method of clam 1, in which the representation of the database system metadata set forth in claim 1, wherein
   the processor reads the representation of the database system metadata for the object in the database system belonging to the particular class and reads the representation of the database system metadata for the another object in the different database system, the object and the another object belonging to the particular class, to produce a representation of the database system metadata that shows one or more differences between metadata of the object and metadata of the another object.

8. The computer implemented method of clam 1, in which the representation of the database system metadata set forth in claim 7, wherein
the representation of the database system metadata is made according to XML standard.

9. The computer implemented method of clam 1, in which the representation of the database system metadata set forth in claim 1 wherein:
the simplified XML (SXML) representation of the database system metadata is made according to SXML standard.

10. A data storage device having stored thereupon a sequence of instructions which, when executed by at least one processor, causes the at least one processor to perform a process, the process comprising:
using the at least one processor to perform an execution of a query that causes the database system metadata to be fetched and used to generate the representation of database system metadata, in which
the data storage device includes the representation of the database system metadata set forth in claim 1.

11. An apparatus employed in a database system that includes a processor and a storage device accessible to the processor for comparing database system metadata for a set of at least two objects belonging to the same class of objects, the database system metadata defining an object in a database system, the object belonging to a class thereof that is defined in the database system metadata and the database system metadata defining the object such that the database system is able to query the object, the database system metadata being included in the storage device, and the apparatus comprising:
at least one processor of the database system to perform an execution of a query that causes the database system metadata to be fetched and used to generate a simplified XML (SXML) representation of the database system metadata for an object of a class, in which
the simplified XML (SXML) representation comprises an aggregate metadata of the object, and
the aggregate metadata is less than metadata of all properties of the object and does not include some metadata, which is specific to an instance of the object, or metadata, which is associated with a property of the object, that cannot be specified by a user during creation of the object; and
a metadata comparator coupled to the at least one processor to compare the simplified XML (SXML) representation to another simplified XML (SXML) representation, which is generated by another database system for another object of the class, in which the another simplified XML (SXML) representation represents one or more differences between metadata for the object and metadata for the another object.

12. The apparatus set forth in claim 11, wherein
the simplified XML (SXML) representation includes properties specified by the database system metadata for one or more objects which a user specifies when creating the one or more objects but do not include database system metadata specifying one or more internal representations of objects in the one or more objects' respective database systems.

13. The apparatus set forth in claim 11 further comprising:
a generator which is executed by the processor to receive the simplified XML representation and to produce a description therefrom of how the object is to be modified to become similar to the another object.

14. The apparatus set forth in claim 13 wherein
the database system comprises a relational database system, and
the description comprises one or more ALTER DDL statements for altering the object so that the object becomes similar to the another object.

15. The apparatus set forth in claim 13 wherein
the database system comprises a relational database system, and
the description comprises an XML representation of one or more ALTER DDL statements for altering the object so that the one object becomes similar to the another object.

16. The apparatus set forth in claim 13, wherein
the simplified XML (SXML) representation of the database system metadata and the another simplified XML (SXML) representation are made according to XML standard.

17. The apparatus set forth in claim 11, wherein
the simplified XML (SXML) representation of the database system metadata and the another simplified XML (SXML) representation are made according to SXML standard.

18. A data storage device characterized in that:
the data storage device includes code which, when executed in the database system, implements the metadata comparator set forth in claim 11.

19. A method for comparing database system metadata for a set of at least two objects belonging to a class of objects, the database system metadata defining an object in a database system, the object belonging to the class that is defined in the database system metadata and the database system metadata defining the object such that the database system is allowed to query the object, the method comprising:
using at least one processor of the database system to perform a process, the process comprising:
performing an execution of a query to fetch the database system metadata for an object of a set of objects of a class;
generating a simplified XML (SXML) representation of the database system metadata for the object of the set of objects by using the database system metadata that is fetched, in which
the simplified XML (SXML) representation comprises an aggregate metadata of the object,
the aggregate metadata is less than metadata of all properties of the object and does not include some metadata, which is specific to an instance of the object, or metadata, which is associated with a property of the object, that cannot be specified by a user during creation of the object, and
the simplified XML (SXML) representation is characterized by being capable of being compared with another simplified XML (SXML) representation generated by another database system for another object of the class to which the object belongs, the another simplified XML (SXML) representation representing one or more differences between metadata for the object and metadata for the another object.

20. The method set forth in claim 19, wherein
the simplified XML (SXML) representation includes one or more properties specified by the database system metadata for one or more objects which the user specifies when creating the one or more objects but do not include database system metadata specifying one or more internal representations of the one or more objects in the one or more objects' respective database systems.

21. The method set forth in claim 19, further comprising:
accessing the another simplified XML (SXML) representation; and
producing a description from the another simplified XML (SXML) representation of how the object is to be modified to become similar to the another object.

22. The method set forth in claim 21, wherein
the database system comprises a relational database system, in which
the description comprises one or more ALTER DDL statements for altering the object so that the object becomes similar to the another object.

23. The method set forth in claim 21, wherein
the database system comprises a relational database system, and
the description comprises an XML representation of one or more ALTER DDL statements for altering the object so that the object becomes similar to the another object.

24. The method set forth in claim 21, wherein
the simplified XML (SXML) representation and the another simplified XML (SXML) representation are made according to XML standard.

25. The method set forth in claim 19, wherein
the simplified XML (SXML) representation and the another simplified XML (SXML) representation are made according to SXML standard.

26. A data storage device characterized in that:
the device includes code which, when executed in a database system, implements the method of claim 19.

27. The computer implemented method of clam 1, in which the simplified XML (SXML) representation or the another simplified XML (SXML) representation set forth in claim 1 further characterized in that:
a given property specified by the database system metadata for the object belonging to the particular class is expressed in only one way in the simplified XML (SXML) representation or the another simplified XML (SXML) representation of the database system metadata.

28. The method set forth in claim 19, in which the simplified XML (SXML) representation for the object is compared with the another simplified XML (SXML) representation for the another object to produce a different representation.

* * * * *

UNITED STATES PATENT AND TRADEMARK OFFICE
CERTIFICATE OF CORRECTION

PATENT NO.         : 8,275,810 B2
APPLICATION NO.    : 11/174909
DATED              : September 25, 2012
INVENTOR(S)        : Barton It is certified that error appears in the above-identified patent and that said Letters Patent is hereby corrected as shown below:

In the Specifications:

In column 1, line 23, delete "AML." and insert -- XML. --, therefor.

In column 6, line 5, delete "set_parse_i tern" and insert -- set_parse_item --, therefor.

In column 6, line 65, delete "system" and insert -- System --, therefor.

In column 7, line 13-14, delete "tranformer" and insert -- transformer --, therefor.

In column 7, line 19-38, delete "XML (Extensible Markup ........... Style/XSL." and insert the same on Col. 7, Line 20, as a new paragraph.

In column 17, line 36, delete "FETCH_xxxo" and insert -- FETCH_xxx() --, therefor.

In column 24, line 56, delete "colums;" and insert -- columns; --, therefor.

In column 26, line 11, delete "DT" and insert -- UDT --, therefor.

In column 26, line 15, delete "col_list,ku$_table_" and insert -- col_list, ku$_table_ --, therefor.

In column 27, line 11, delete "restricitions:" and insert -- restrictions: --, therefor.

In column 27, line 65, delete "ku$_table_t" and insert -- ku$_table_t. --, therefor.

In column 36, line 4, delete "fill" and insert -- full --, therefor.

In column 37, line 50, delete "XLS" and insert -- XSL --, therefor.

Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 8,275,810 B2

In column 39, line 8-16, delete "The generated ........... DDL." and insert the same on Col. 39, Line 7, as a continuation of the same paragraph.

In column 39, line 29, delete "compatred." and insert -- compared. --, therefor.

In column 42, line 20, delete "name–" and insert -- name1– --, therefor.

In the Claims:

In column 43, line 38, in Claim 1, delete "A representation" and insert -- A computer implemented method for generating a representation --, therefor.

In column 43, line 42-44, in Claim 1, after "object," delete "the database system metadata having been fetched by an execution of a query on the database system,".

In column 43, line 51, in Claim 1, after "that:" insert -- using at least one processor to perform an execution of a query that causes the database system metadata to be fetched and used to generate the representation of database system metadata, in which --. (as a new paragraph)

In column 43, line 67, in Claim 1, delete "the" and insert -- the at least one --, therefor.

In column 44, line 5, in Claim 1, delete "objects" and insert -- object --, therefor.

In column 44, line 5, in Claim 1, delete "systems." and insert -- system and the database system metadata for the another object in the different database system. --, therefor.